United States Patent
Kim et al.

(10) Patent No.: US 10,802,690 B2
(45) Date of Patent: Oct. 13, 2020

(54) DISPLAY APPARATUS AND CONTROLLING METHOD THEREOF

(71) Applicant: SAMSUNG ELECTRONICS CO., LTD., Suwon-si, Gyeonggi-do (KR)

(72) Inventors: Sang-ho Kim, Hwaseong-si (KR); Gwan-Hyung Kim, Suwon-si (KR); Hui-jun Shim, Suwon-si (KR); Ji-hye Ha, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 173 days.

(21) Appl. No.: 15/790,156

(22) Filed: Oct. 23, 2017

(65) Prior Publication Data

US 2018/0173407 A1    Jun. 21, 2018

(30) Foreign Application Priority Data

Dec. 21, 2016  (KR) .................. 10-2016-0175784

(51) Int. Cl.
*G06F 3/048*     (2013.01)
*G06F 3/0484*    (2013.01)
(Continued)

(52) U.S. Cl.
CPC ...... *G06F 3/04845* (2013.01); *G06F 3/03545* (2013.01); *G06F 3/0482* (2013.01);
(Continued)

(58) Field of Classification Search
CPC ....... G06F 3/04883; G06F 2203/04808; G06F 3/017; G06F 3/011; G06F 3/0488;
(Continued)

(56) References Cited

U.S. PATENT DOCUMENTS 5,502,803 A * 3/1996 Yoshida .............. G06F 3/04883
                                              715/201
2008/0141181 A1* 6/2008 Ishigaki .............. G06F 3/04847
                                              715/863
(Continued)

FOREIGN PATENT DOCUMENTS

JP    2008-118301       5/2008
KR    10-2013-0112350   10/2013
(Continued)

OTHER PUBLICATIONS

Lee et al., SketchInsight: natural Data Exploration on Interactive Whiteboards leceraging Pen and Touch interaction; IEEE; 2015; pp. 199-206.*

(Continued)

*Primary Examiner* — Linh K Pham
(74) *Attorney, Agent, or Firm* — Nixon & Vanderhye P.C.

(57) ABSTRACT

A display apparatus capable of being touched plural times by a single user or being used by a plurality of users is provided. The display apparatus includes: a display; a sensor sensing a user touch on the display; and a processor configured to execute a writing function corresponding to a first touch when the first touch is sensed through the sensor and executing a function corresponding to a second touch of a user at a coordinate value at which the second touch is sensed in response to the second touch when the second touch is sensed in a predetermined range of the first touch based on a coordinate value at which the first touch is sensed during a period in which the first touch is input.

18 Claims, 34 Drawing Sheets

(51) Int. Cl.
*G06F 3/0482* (2013.01)
*G06F 3/0354* (2013.01)
*G06F 3/0488* (2013.01)

(52) U.S. Cl.
CPC ........ *G06F 3/0488* (2013.01); *G06F 3/04883* (2013.01); *G06F 2203/04106* (2013.01); *G06F 2203/04807* (2013.01); *G06F 2203/04808* (2013.01)

(58) Field of Classification Search
CPC .. G06F 3/04886; G06F 3/03547; G06F 3/041; G06F 3/03545; G06F 3/0412; G06F 2203/04106
See application file for complete search history.

(56) References Cited

U.S. PATENT DOCUMENTS

| | | | |
|---|---|---|---|
| 2011/0179387 A1* | 7/2011 | Shaffer | G06F 3/04883 715/835 |
| 2011/0288850 A1 | 11/2011 | Shen et al. | |
| 2012/0050171 A1* | 3/2012 | Wong | G06F 3/044 345/173 |
| 2012/0056829 A1* | 3/2012 | Kasahara | G06F 3/04886 345/173 |
| 2012/0062489 A1* | 3/2012 | Andersson | G06F 3/04883 345/173 |
| 2014/0028546 A1* | 1/2014 | Jeon | G06F 3/014 345/156 |
| 2014/0035946 A1* | 2/2014 | Chang | G06F 3/017 345/619 |
| 2014/0071061 A1 | 3/2014 | Lin et al. | |
| 2014/0168177 A1* | 6/2014 | Mkrtchyan | G06F 3/041 345/179 |
| 2014/0172231 A1* | 6/2014 | Terada | G06K 9/00832 701/36 |
| 2014/0298274 A1* | 10/2014 | Yang | G06F 21/6209 715/863 |
| 2014/0361982 A1* | 12/2014 | Shaffer | G06F 9/541 345/156 |
| 2014/0368453 A1* | 12/2014 | Yamaguchi | G06F 3/03545 345/173 |
| 2015/0121305 A1 | 4/2015 | Saund et al. | |
| 2015/0317053 A1* | 11/2015 | Baek | G06F 3/0488 715/765 |
| 2015/0363035 A1* | 12/2015 | Hinckley | G06F 3/0416 345/173 |
| 2016/0034117 A1* | 2/2016 | Kim | G06F 3/04817 715/771 |
| 2016/0041619 A1* | 2/2016 | Ishiwata | G06F 3/017 715/857 |
| 2016/0048318 A1* | 2/2016 | Markiewicz | G06F 3/041 345/173 |
| 2016/0139731 A1* | 5/2016 | Kim | G06F 3/0416 345/173 |
| 2016/0139741 A1* | 5/2016 | Sakai | G06F 3/0482 715/841 |
| 2016/0216884 A1* | 7/2016 | Takahashi | G06K 9/222 |
| 2016/0246472 A1* | 8/2016 | Zhao | G06F 1/1694 |
| 2016/0283105 A1* | 9/2016 | Maloo | G06F 3/04886 |
| 2016/0313909 A1* | 10/2016 | Choy | G06F 3/04883 |
| 2017/0075517 A1* | 3/2017 | Na | G06F 3/0482 |
| 2017/0115844 A1* | 4/2017 | Markiewicz | G06F 3/03545 |

FOREIGN PATENT DOCUMENTS

| | | |
|---|---|---|
| KR | 10-2015-0014083 | 2/2015 |
| KR | 10-2016-0008432 | 1/2016 |

OTHER PUBLICATIONS

Walny et al., Understanding Pen and Touch Interaction for Data Exploration on Interactive Whiteboards; IEEE; 2012; pp. 2779-2788.*

* cited by examiner

DISPLAY APPARATUS AND CONTROLLING METHOD THEREOF

CROSS-REFERENCE TO RELATED APPLICATION

This application is based on and claims priority under 35 U.S.C. § 119 to Korean Patent Application No. 10-2016-0175784, filed on Dec. 21, 2016, in the Korean Intellectual Property Office, the disclosure of which is incorporated by reference herein in its entirety.

BACKGROUND

Field

The present disclosure relates generally to a large screen display apparatus and a controlling method thereof, and for example, to a method in which a plurality of users use a plurality of touches, respectively, in a large screen electronic board, and an electronic board.

Description of Related Art

In accordance with the development of electronic techniques, various types of electronic apparatuses have been developed. Recently, small displays such as a smartphone, a tablet personal computer (PC), and the like, and large display apparatuses such as a television (TV), an electronic board, and the like, include touch screens. Users may control the display apparatuses using the touch screens.

Meanwhile, in a touch display apparatus, techniques about various touch motion operations for increasing convenience of users have been developed. For example, a technique using a bezel housed in a screen of the smartphone allows the user to more intuitively and conveniently use a smartphone apparatus.

However, most of such touch motions are motions used in a small screen display apparatus such as the smartphone, and are techniques about a touch using one finger or two fingers. In addition, such a touch is not affected by whether a hand controlling the display apparatus is the left hand or the right hand.

Therefore, in the large screen display apparatuses such as the electronic board, and the like, various techniques for convenience of the users have been suggested. However, most of such techniques are techniques about touches applied to the small screen display apparatus, and many techniques about touches that may be additionally considered in the large screen display apparatus do not exist.

In detail, generally, a display of the electronic board has a size larger than those of other display apparatuses. Therefore, a user of the electronic board may control the electronic board using both hands. In addition, several users may simultaneously control the electronic board.

Generally, the user of the electronic board writes on the electronic board using a pen having a writing function. In this case, various methods for converting the writing function into functions other than the writing function, such as an eraser function or functions of changing a thickness or a color of the pen have been suggested.

For example, menus providing various functions are fixed at an edge of the electronic board, and the user may touch a user interface (UI) element of the menu such as an icon using the pen or his/her hand to select a desired function. However, in this case, the menus are fixed, and the user should thus separately move to places at which the menus are positioned to select the desired function.

In addition, in the case in which a plurality of users simultaneously use the electronic board, a problem about who uses the menus exists.

To supplement such a disadvantage, a method of invoking the menu to a position desired by the user through a touch of the other hand that does not write on the electronic board is suggested. In this case, the user does not need to move a long distance to execute the desired function. However, even in the case in which the menu is movable, the menu hides a screen in a process in which the user writes on the electronic board, and the user should perform an additional operation to remove the menu or move the menu to the desired position.

SUMMARY

Example embodiments of the present disclosure address the above disadvantages and other disadvantages not described above.

The present disclosure provides a display apparatus capable of reducing additional operations of a plurality of users and ensuring the right of menu possession between the users by allowing each of the plurality of users to individually invoke and remove menus in the case in which the plurality of users use the display apparatus such as an electronic board, and a controlling method thereof.

According to an example aspect of the present disclosure, a controlling method of a display apparatus includes: sensing a first touch on a display screen; executing a function corresponding to the first touch; sensing a second touch in a predetermined range based on a coordinate value at which the first touch is sensed during a period in which the first touch is input; and executing a function corresponding to the second touch at a coordinate value at which the second touch is sensed in response to the second touch.

The executing of a function corresponding to the second touch may include executing a menu user interface (UI) including a plurality of UI elements in the vicinity of the coordinate value at which the second touch is sensed, in the case in which the second touch is a touch having a first shape.

The executing of a function corresponding to the second touch may further include moving the menu UI to correspond to a moving direction of the second touch in the case in which the second touch moves during a period in which the menu UI is displayed.

The executing of a function corresponding to the second touch may further include removing the menu UI on the display screen in the case in which the second touch is removed during a period in which the menu UI is displayed.

The executing of a function corresponding to the second touch may further include executing a function corresponding to a touched UI element in the case in which one of the plurality of UI elements is touched during a period in which the menu UI is displayed.

In the executing of a function corresponding to the second touch, an eraser function of erasing a writing function may be executed in the vicinity of the coordinate value at which the second touch is sensed, in the case in which the second touch is a touch having a second shape.

The first touch may be a pen touch, and the second touch may be a finger touch.

The controlling method may further include sensing pen touches and hand touches, wherein the pen touches are distinguished from each other using frequencies set in pens of each of a plurality of users.

The controlling method may further include displaying an indicator indicating users corresponding to a plurality of menus in the case in which the plurality of menus are displayed by each of second touches of the plurality of users.

According to another example aspect of the present disclosure, a display apparatus includes: a display; a sensor configured to sense a touch on the display; and a processor configured to execute a writing function corresponding to a first touch when the first touch is sensed through the sensor and to execute a function corresponding to a second touch at a coordinate value at which the second touch is sensed in response to the second touch when the second touch is sensed in a predetermined range based on a coordinate value at which the first touch is sensed during a period in which the first touch is input.

The processor may control the display to display a menu UI including a plurality of UI elements in the vicinity of the coordinate value at which the second touch is sensed in the case in which the second touch is a touch having a first shape.

The processor may control the display to move the menu UI to correspond to a moving direction of the second touch in the case in which the second touch moves during a period in which the menu UI is displayed.

The processor may control the display to remove the menu UI in the case in which the second touch is removed during a period in which the menu UI is displayed.

The menu UI may include at least one of: at least one UI element for setting the writing function and at least one UI element for setting the display apparatus.

The processor may execute an eraser function of erasing the writing function in the vicinity of the coordinate value at which the second touch is sensed wherein the second touch is a touch having a second shape.

The first touch may be a pen touch and the second touch may be a finger touch, and the sensor may include: a first sensor configured to sense the pen touch; and a second sensor configured to sense the finger touch.

Pen touches of a plurality of users may be distinguished from each other using frequencies set in pens of each of the plurality of users.

The processor may control the display to display an indicator indicating users corresponding to a plurality of menus in the case in which the plurality of menus are displayed by each of second touches of the plurality of users.

According to still another example aspect of the present disclosure, a method of controlling a display apparatus includes: obtaining coordinate values at which a plurality of fingers of a user touch a display when finger touches of the plurality of fingers touching the display are sensed; analyzing the coordinate values at which the plurality of fingers touch the display to decide at least one of the number of fingers touching the display and a type of hand touch; and executing a function corresponding to the finger touch on at least based on the type of hand touch and the number of fingers.

The number of fingers touching the display may be at least three.

Through the contents described above, in the present disclosure, in a large screen display apparatus such as an electronic board, a plurality of users may be allowed to individually easily invoke menus, thereby addressing problems associated with additional operations or the right of menu possession.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
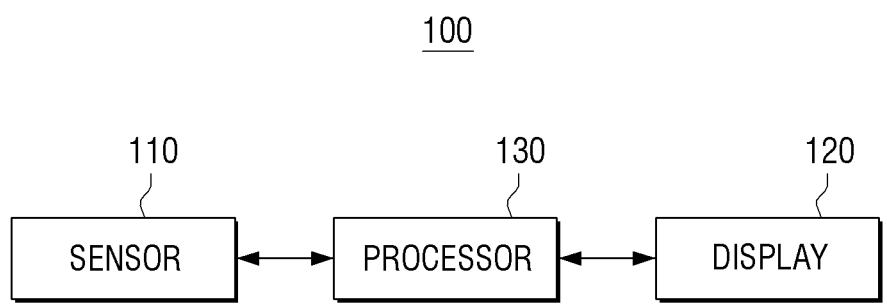
FIG. 1 is a block diagram illustrating an example display apparatus according to an example embodiment of the present disclosure.

After terms used in the present disclosure are briefly described, the present disclosure will be described in greater detail.

General terms that are currently widely used were selected as terms used in example embodiments of the present disclosure in consideration of functions in the present disclosure, but may be changed depending on the intention of those skilled in the art or a judicial precedent, the emergence of a new technique, and the like. In addition, in a specific case, arbitrary terms may be used. In this case, the meaning of such terms will be mentioned in detail in a corresponding description portion of the present disclosure. Therefore, the terms used in example embodiments of the present disclosure should be defined on the basis of the meaning of the terms and the contents throughout the present disclosure rather than simple names of the terms.

Since the present disclosure may be variously modified and have several example embodiments, specific example embodiments of the present disclosure will be illustrated in the drawings and be described in detail in the detailed description. However, it is to be understood that the present disclosure is not limited to specific example embodiments, but includes all modifications, equivalents, and substitutions without departing from the scope and spirit of the present disclosure. When it is decided that a detailed description for the known art related to the present disclosure may obscure the gist of the present disclosure, such a detailed description may be omitted.

Terms 'first', 'second', and the like, may be used to describe various components, but the components are not to be construed as being limited by the terms. The terms are used only to distinguish one component from another component.

Singular forms are intended to include plural forms unless the context clearly indicates otherwise. It should be understood that terms "comprise" or "include" used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

Hereinafter, example embodiments of the present disclosure will be described in greater detail with reference to the accompanying drawings so that those skilled in the art to which the present disclosure pertains may easily practice the present disclosure. However, the present disclosure may be modified in various different forms, and is not limited to example embodiments described herein. In addition, in the drawings, portions unrelated to the description may be omitted to more clearly describe the present disclosure, and similar reference numerals will be used to describe similar portions throughout the present specification.

FIG. 1 is a block diagram illustrating an example display apparatus according to an example embodiment of the present disclosure.

The display apparatus 100 according to an example embodiment of the present disclosure may, for example, and without limitation, be a large display apparatus such as an E-Board, a digital information display (DID), or a large format display (LFD), or may be a tablet personal computer (PC) having a predetermined size or more. However, the present disclosure is not limited thereto, but may be applied to other touch display apparatuses.

The display apparatus 100 includes a sensor 110, a display 120, and a processor (e.g., including processing circuitry) 130.

The sensor 110 may include various circuitry and/or sensors that sense a user touch input onto the display 120, and transmit the sensed user touch to the processor 130.

Here, the user touch may include a first touch and a second touch. However, the user touch is not limited to including the first touch and the second touch, but may include a plurality of touches (three or more touches), if necessary.

The first touch may be a pen touch, and the second touch may be a hand touch. However, the first touch and the second touch are not limited thereto. That is, both of the first touch and the second touch may be pen touches or be hand touches. In the following disclosure, a case in which the first touch is the pen touch and the second touch is the hand touch will be described for ease of explanation, but it will be understood that the disclosure is not so limited.

Here, the hand touch may refer, for example, to a touch manner using a hand of a user. For example, the hand touch may include touches using a finger, the back of the hand, the palm, and the like, of the user. In addition, although the hand touch of the user is described in the present disclosure, the hand touch may also include a touch using a body part of the user. Meanwhile, the pen touch is not the touch through the body portion of the user, but may refer, for example, to a touch manner using various input apparatuses such as a stylus pen, a digital pen, and the like, but the input apparatuses are not limited to these apparatuses.

A method of sensing such hand touch and pen touch inputs may, for example, and without limitation, be any one of a resistive manner, a capacitive manner, an infrared (IR) manner, a surface acoustic wave (SAW) manner, an electromagnetic resonance (EMR) manner, and an electro-magnetic induction (EMI) manner. However, the present disclosure is not limited thereto. That is, various touch sensing manners that may be inferred from the related art may be used.

The sensor 110 may include various circuitry and/or sensors to obtain data for sensing the hand touch or the pen touch. In this case, the processor 130 may decide a type of hand touch using the data of the hand touch sensed by the sensor 110. The type of hand touch may include a pattern of the hand touch or a shape of the hand touch. Here, the pattern of the hand touch may refer, for example, and without limitation, to various operations that may be performed using the hand of the user, such as a motion, a gesture, and the like, of the hand of the user.

In addition, the shape of the hand touch may be a shape of the hand of the user touching the display 120. For example, in the case in which the hand of the user touches the display 120, the processor 130 may figure out the shape of the hand by obtaining a coordinate value at which the hand touches the display from the sensor 110. However, the processor 130 is not limited thereto, but may figure out the shape of the hand on the basis of a touch area of the hand or the finger, the number of fingers touching the display, a distance between fingers, or the like.

In an example embodiment of the present disclosure, the sensor 110 may include a first sensor sensing the hand touch and a second sensor sensing the pen touch. A detailed description for the first sensor and the second sensor will be provided in greater detail below with reference to FIGS. 2A to 2C.

The display 120 may output image data. The display 120 may display functions executed by the processor 130. For example, and without limitation, the display 120 may display a written content by the pen touch of the user, and may display a menu user interface (UI), an eraser UI, and the like, by the hand touch of the user.

Here, the display 120 may be coupled to the sensor 110, or the like, to become a touch display.

The processor 130 may include various processing circuitry and controls a general operation of the display apparatus 100. Particularly, when the user touch is sensed through the sensor 110, the processor 130 may control the display 120 to execute a function corresponding to the user touch.

For example, when the first touch is sensed through the sensor 110, the processor 130 may execute a writing function corresponding to the first touch. The processor 130 may obtain a coordinate value at which the first touch is input, and may receive the second touch input by the user in a predetermined range based on the obtained coordinate value. In the case in which the sensor 110 senses the second touch in the predetermined range, the processor 130 may execute a function corresponding to the second touch.

Here, the predetermined range may be determined based on, for example, and without limitation, a radius of action of the user based on the coordinate value of the first touch. However, the predetermined range is not limited thereto, but may be determined by deciding a position of the user using a camera or may be determined by various other methods.

As described above, the sensor 110 may sense the shape of the hand touch of the user. The processor 130 may control the display 120 to display various functions depending on the shape of the hand touch of the user.

As an example, in the case in which the hand touch has an O shape, the processor 130 may control the display 120 to display a first menu UI for selecting a kind of pen in the vicinity of the hand touching the display.

As another example, in the case in which the hand touch has a C shape, the processor 130 may control the display 120 to a second menu UI capable of selecting a color and a thickness of a pen.

As still another example, in the case in which the hand touch has a shape as if the user grasps a board eraser, the processor 130 may control the display 120 to display an eraser UI.

As yet still another example, in the case in which a plurality of finger touches are sensed through the sensor 110, the processor 130 may execute functions corresponding to the finger touches based on at least one of the type of hand touch and the number of fingers touching the display. However, the processor 130 is not limited to these examples, but may control the display apparatus 100 to execute various functions corresponding to shapes of various hand touches.

For example, in the case in which the plurality of finger touches of the user are sensed, the processor 130 may obtain coordinate values of the input finger touches. Through the coordinate values obtained as described above, the processor 130 may analyze a plurality of touch coordinate values to decide at least one of the number of fingers touching the display and the type of hand touch.

Here, the type of hand touch may be decided by measuring a distance between coordinate values at which the plurality of fingers touch the display and analyzing the measured distance.

It may be preferable that the number of finger touches of the user is at least three. However, the number of finger touches is not limited thereto, but may also be one or two.

The types of hand touches decided by the processor 130 may be three. The types of hand touches may refer, for example, and without limitation, to a case in which the hand touch is the left hand, a case in which the hand touch is the right hand, and a case in which it may not be decided whether the hand touch is the left hand or the right hand. However, the types of hand touches are not limited to the three described above. That is, various other types of hand touches may exist.

In the case in which a first touch operation is input to the display 120 according to an example embodiment of the present disclosure, the processor 130 may perform a first function on a screen of the display apparatus 100.

For example, in the case in which five fingers of the left hand touch the display 120, the processor 130 may generate the eraser UI on the screen of the display apparatus 100, and in the case in which five fingers of the right hand touch the display 120, the processor 130 may generate the menu UI on the screen of the display apparatus 100.

However, functions performed by the processor 130 may also be specific operations or various quick operations executing specific menus, as well as a UI generating function.

When the hand touch sensed through the sensor 110 is maintained, the processor 130 may control the display 120 to maintain the displayed menu UI. In the case in which the hand touch of the user moves during a period in which the menu UI is displayed on the display 120, the processor 130 may control the display 120 to move and display the menu UI along a moving direction of the hand touch.

In addition, in the case in which the hand touch is removed during a period in which the menu UI is displayed, the processor 130 may control the display 120 to remove the menu UI.

However, a feature in which the menu UI is removed depending on the removal of the hand touch is only an example. For example, even though the hand touch is removed, the processor 130 may control the display 120 so that the menu UI is not removed. In this case, one of UI elements included in the menu UI may be a UI element serving to end the menu UI. As yet still another example, in the case in which the hand touch is removed, the processor 130 may control the display 120 to remove the menu UI when an additional input of the user to the menu UI does not exist after a predetermined time elapses.

As yet still another example, in the case in which the hand touch of the user is a double-tap touch in which the hand continuously touches the display twice, the processor 130 may control the display 120 so that the menu UI is not removed even though the hand touch is removed. In this case, in the case in which a hand touch having the same shape is sensed during a period in which the menu UI is maintained, the processor 130 may control the display 120 to remove the menu UI.

However, the present disclosure is not limited to the above-mentioned examples. That is, the menu UI may be removed by various methods that may be inferred by those skilled in the art.

Meanwhile, in the case in which the first touch is the pen touch, the processor 130 may control the display 120 to execute and display a function corresponding to the pen touch. The pen touch in a menu UI region including a plurality of UI elements may be a function of selecting the UI element.

In addition, a function corresponding to the pen touch in a display region in which writing is possible may be a writing function. In the case in which the pen touch of the user is performed in the display region, the writing function may be a function of displaying a predetermined color on a coordinate value at which the pen touches the display.

However, the first touch is not limited to the above-mentioned function, and the function corresponding to the pen touch may be a function of displaying a straight line corresponding to the pen touch or displaying a figure such as a quadrangle or a circle, or may be various function of a general electronic board.

Figure 2A:
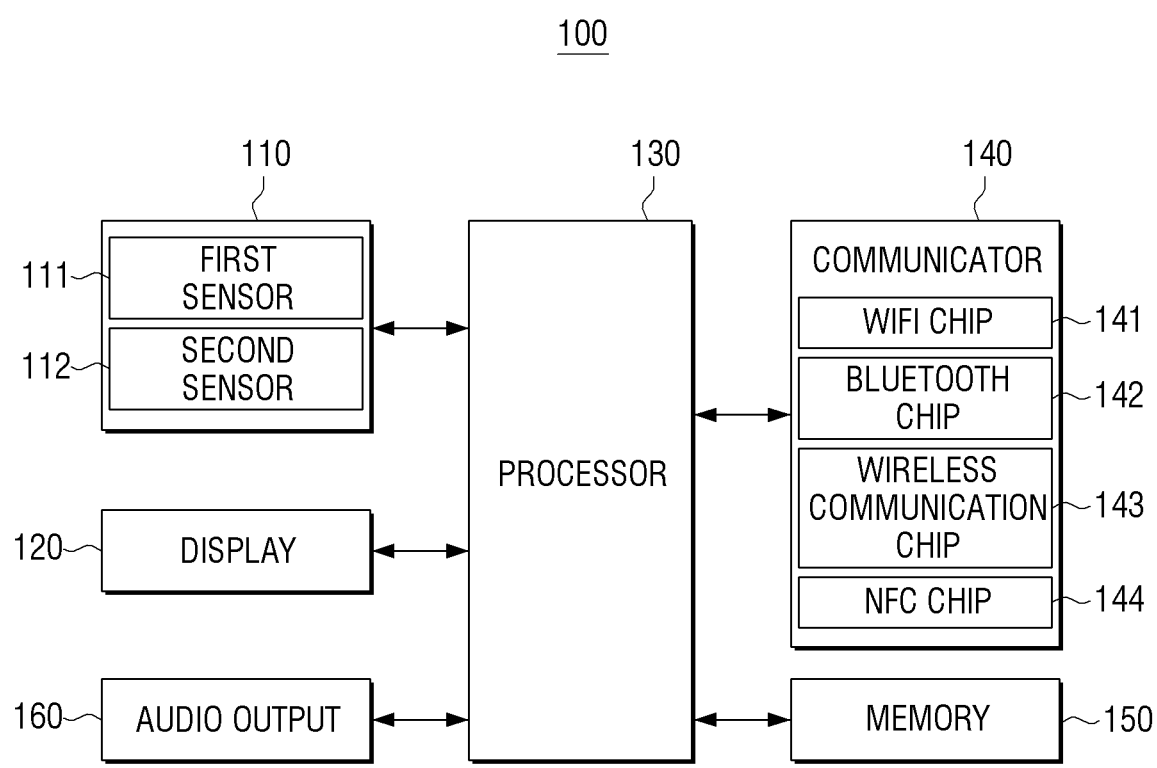
FIGS. 2A, 2B and 2C are block diagrams and diagrams illustrating an example display apparatus according to an example embodiment of the present disclosure.
Figure 2B:
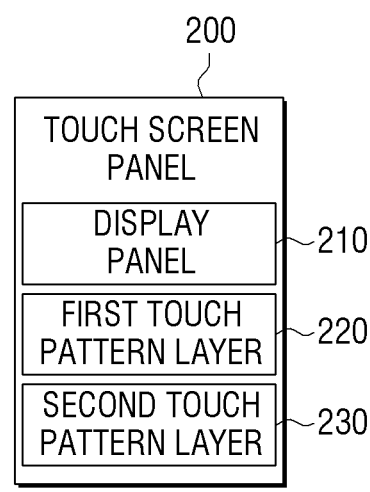
Figure 2C:
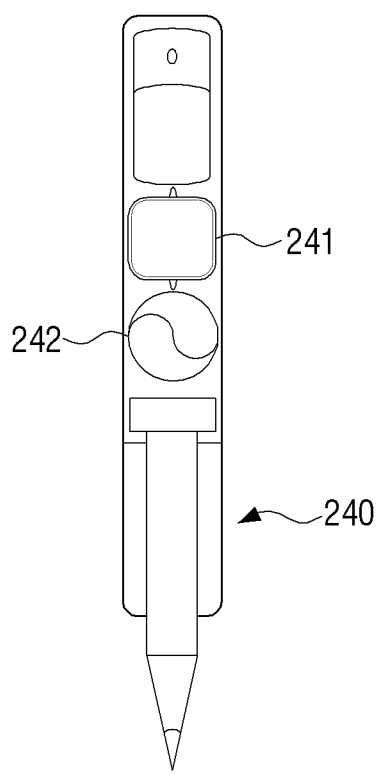

FIGS. 2A, 2B and 2C are block diagrams illustrating an example display apparatus according to an example embodiment of the present disclosure.

The display apparatus 100 according to an example embodiment of the present disclosure may further include a communicator (e.g., including communication circuitry) 140, a memory 150, and an audio output (e.g., including audio output circuitry) 160, in addition to the sensor (e.g., including various sensors) 110, the display 120, and the processor (e.g., including processing circuitry) 130. However, the display apparatus 100 is not limited thereto. That is, components may be added to or omitted from the display apparatus 100, if necessary.

The sensor 110 may include a first sensor 111 and a second sensor 112. In detail, the first sensor 111 may sense the pen touch of the user, and the second sensor 112 may sense the hand touch of the user. However, the sensor 110 is not limited thereto, but may sense the touches by various sensing methods.

Here, a touch manner input through the sensor 110 may be an electrostatic touch. However, the touch manner is not limited thereto, but may, for example, and without limitation, be any one of a resistive manner, a capacitive manner, an infrared (IR) manner, a surface acoustic wave (SAW) manner, an optical manner, an electro-magnetic resonance (EMR) manner, and an electro-magnetic induction (EMI) manner, or the like.

The processor 130 may include various processing circuitry and receive sensed signals from the first sensor 111 and the second sensor 112. That is, the processor 130 may control the display 120 to execute different functions with respect to the signal transferred through the first sensor 111 and the signal transferred through the second sensor 112. Therefore, the processor 130 may control the display 120 to distinguish the pen touch and the hand touch of the user from each other and execute and display different functions with respect to the pen touch and the hand touch.

The communicator 140 may include various communication circuitry, such as, for example, and without limitation, at least one of a wireless fidelity (WiFi) chip 141, a Bluetooth chip 142, a wireless communication chip 143, and a near field communication (NFC) chip 144. Particularly, the WiFi chip 141 and the Bluetooth chip 142 may perform communication in a WiFi manner and a Bluetooth manner, respectively. In the case of using the WiFi chip 141 or the Bluetooth chip 142, various kinds of connection information such as a service set identifier (SSID), a session key, and the like, are first transmitted and received, communication is connected using the connection information, and various kinds of information may then be transmitted and received. The wireless communication chip 143 means a chip performing communication depending on various communication protocols such as Institute of Electrical and Electronics Engineers (IEEE), Zigbee, $3^{rd}$ generation (3G), $3^{rd}$ generation partnership project (3GPP), long term evolution (LTE), and the like. The NFC chip 144 means a chip operated in the NFC manner using a band of 13.56 MHz among various radio frequency identification (RFID) frequency bands such as 135 kHz, 13.56 MHz, 433 MHz, 860 to 960 MHz, 2.45 GHz, and the like.

The communicator 140 may perform communication with an external apparatus. The processor 130 may control the display 120 to receive and display various contents such as a video source, an audio source, and the like, from the external apparatus through the communicator 140.

The memory 150 may store an operating system (O/S) for driving the display apparatus 100 therein. In addition, the memory 150 may store various software programs or applications for operating the display apparatus 100 according to various example embodiments of the present disclosure therein. The memory 150 may store various kinds of information such as various kinds of data input, set, or generated during execution of the programs or the applications therein.

In addition, the memory 150 may include various software modules for operating the display apparatus 100 according to various example embodiments of the present disclosure, and the processor 130 may execute the various software modules stored in the memory 150 to perform an operation of the display apparatus 100 according to various example embodiments of the present disclosure.

To this end, the memory 150 may include a semiconductor memory such as a flash memory, or the like, or a magnetic storing medium such as a hard disk, or the like.

The audio output 160 may include various audio output circuitry and output an audio signal. For example, in the case in which the electronic apparatus 100 receives a moving picture content from an external server through the communicator 140, the processor 130 may control the display 120 to display the moving picture content, and may control the audio output 160 to play an audio included in the moving picture content.

FIG. 2B is a diagram illustrating an example touch screen panel according to an example embodiment of the present disclosure.

According to an example embodiment of the present disclosure, a touch screen panel 200 may be configured by combining the display 120 and the sensor 110 with each other. For example, the touch screen panel 200 may include a display panel 210, a first touch pattern layer 220, and a second touch pattern layer 230. That is, the display 120 may be the display panel 210, the first sensor 111 may be the first touch pattern layer 220, and the second sensor 112 may be the second touch pattern layer 230.

The display panel 210 may output image data. That is, the display panel 210 may display functions executed by the processor 130. In this case, the display panel 210 may, for example, and without limitation, be any one of a liquid crystal display (LCD) panel, a plasma display panel (PDP), an organic light emitting diode (OLED), a vacuum fluorescent display (VFD), a field emission display (FED), and an electro luminescence display (ELD), or the like.

The first touch pattern layer 220 and the second touch pattern layer 230 may sense touch inputs of the user. In this case, the first touch pattern layer 220 and the second touch pattern layer 230 may be a two-dimensional (2D) touch pattern layer and a pen touch pattern layer, respectively.

The 2D touch pattern layer may sense a 2D touch corresponding to a case in which the finger of the user touches the display panel 210. The pen touch pattern layer may sense a touch of a user input apparatus such as a pen on the display panel 210. Here, the user input apparatus may be a stylus pen, a light pen, a digital pen, or the like, but is not limited to a kind of pen. That is, various input apparatuses for a touch input may be used.

In addition, the first touch pattern layer 220 and the second touch pattern layer 230 are not limited to the 2D touch pattern layer and the pen touch pattern layer described above, respectively. The touch pattern layer may include various forms such as a three-dimensional (3D) touch pattern layer, a force touch pattern layer, and the like.

FIG. 2C is a diagram illustrating example components of a stylus pen used in the display apparatus.

As illustrated in FIG. 2C, the stylus pen 240 may include a pen integrated circuit (IC) 241, a signal generator (e.g., including signal generating circuitry) 242, and a writing pressure module (not shown).

Here, the pen IC 241 may include various circuitry to control a general operation of the stylus pen 240. The signal generator 242 may include various signal generating circuitry to generate frequency signals for distinguishing a plurality of pens from each other. In the case in which a plurality of touches of a plurality of stylus pens 240 on the touch screen panel 200 are sensed, the processor 130 may distinguish the respective stylus pens from each other using frequencies generated in a plurality of signal generators 242. Here, the processor 130 may use different frequencies depending on users or functions. In the case in which two or more stylus pens 240 have different frequencies depending on the users, the processor 130 may distinguish the respective stylus pens 240 from each other to sense the respective second touches in the respective predetermined ranges. This will be described below in detail with reference to FIG. 7.

The writing pressure module (not shown) may include various circuitry to sense a writing pressure of the stylus pen 240 in the case in which the stylus pen 240 touches the touch display panel 200. For example, in the case in which the writing pressure is lower than a predetermined pressure, the touch of the stylus pen 240 may not be recognized. However, some of the components of the stylus pen 240 described above may be omitted or other components may be added to the stylus pen 240.

Figure 3:
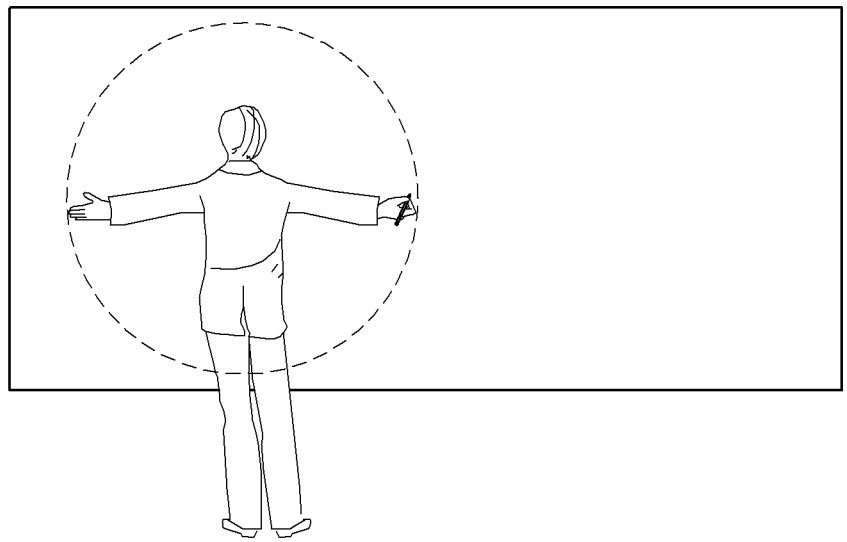
FIG. 3 is diagram illustrating an example method of sensing a hand touch in a predetermined range according to an example embodiment of the present disclosure.

FIG. 3 is diagram illustrating an example method of sensing a hand touch in a predetermined range according to an example embodiment of the present disclosure.

The user may start to perform a pen touch for writing. In the case in which the processor 130 receives the pen touch sensed through the sensor 110, the processor 130 may obtain a coordinate value for a position at which the pen touches the display 120. The processor 130 may receive a second touch of the user in a predetermined range on the basis of the obtained coordinate value. When the second touch of the user is sensed in the predetermined range, the processor 130 may control the display 120 to execute and display a function corresponding to the second touch.

In the case in which any touch that is out of the predetermined range is input, the processor 130 may not execute a function corresponding to any touch.

As another example, the processor 130 may sense any touch that is out of the predetermined range as a touch of another user, and perform a function corresponding to the touch of another user. In the case in which any touch that is out of the predetermined range is recognized as the touch of another user, the processor 130 may obtain a coordinate value for any touch, and set a predetermined range corresponding to the obtained coordinate value.

However, this is only an example of the present disclosure, and the present disclosure is not limited thereto. That is, in the case in which any touch that is out of the predetermined range is input, the processor 130 may control the display 120 to display a message informing the user of any touch that is out of the predetermined range or control the display 120 to perform different functions depending on kinds of any touch (for example, whether or not any touch is the hand touch or the pen touch).

As illustrated in FIG. 3, the predetermined range may have a form of a circle. Here, a diameter of the circle may be a length corresponding to a width of both arms of the user. In addition, the obtained coordinate value may be positioned at a circumference of the circle. The length corresponding to the width of both arms of the user may be an average of widths of both arms of adults of countries using the display apparatus.

Meanwhile, the diameter of the circle may also be set to ⅔ or ½ of the width of both arms of the user. That is, a ratio of the diameter of the circle may be adjusted on the basis of the width of both arms of the user in consideration of a size of the display apparatus 100.

As another example, the diameter of the circle for identifying the predetermined range may be calculated (identified) by inputting body conditions of the user to the display apparatus 100.

As still another example, the predetermined range may be a range using the coordinate value obtained by the pen touch as the center of the circle and using an appropriate length as a radius of the circle. Here, the appropriate length may be variously determined to be the width of both arms of the user, ⅔ or ½ of the width of both arms of the user, and the like.

However, this is only an example, and the diameter of the circle may be any fixed value, and the predetermined range may have various forms such as an oval form, a rectangular form, and the like, rather than the form of the circle.

FIGS. 4A, 4B, 4C and 4D are diagrams illustrating an example method of executing and removing a menu UI corresponding to a hand touch according to an example embodiment of the present disclosure.

Figure 4A:
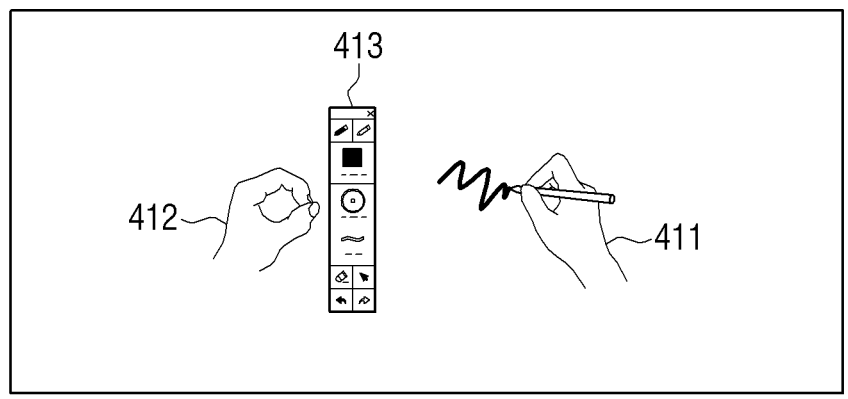
FIGS. 4A, 4B, 4C and 4D are diagrams illustrating an example method of executing and removing a menu user interface (UI) corresponding to a hand touch according to an example embodiment of the present disclosure.

As illustrated in FIG. 4A, during a period in which a pen touch 411 of a user is received, the processor 130 may receive a hand touch 412 through the sensor 110 and generate a menu UI 413. However, even in the case in which the pen touch 411 of the user does not exist, the processor 130 may control the display 120 to execute the menu UI 413 through the hand touch 412.

Here, the hand touch 412 may have various shapes. In detail, the hand touch 412 may have the various shapes, and functions corresponding to the various shapes may be executed. Meanwhile, in the case in which the shape of the hand touch 412 is changed during a period in which the processor 130 receives the hand touch 412 through the sensor 110, the processor 130 may control the display apparatus 100 to execute a function corresponding to the changed shape.

For example, in the case in which a first hand touch has an O shape and a second hand touch has a C shape, when the first hand touch is changed to the second hand touch, the processor 130 may control the display 120 to execute a menu UI extended from the menu UI.

Here, in the case in which the first hand touch is input and is changed to the second hand touch within a predetermined time (for example, 0.5 seconds), the processor 130 may control the display apparatus 100 to execute a function corresponding to the second hand touch. However, the predetermined time is not limited to 0.5 seconds, but may be variously determined.

For example, in the case in which the shape of the hand touch is changed during a period in which the hand touch is continued, the processor 130 may control the display apparatus 100 to execute a function corresponding to the changed shape of the hand touch.

Here, the hand touch 412 of the user may have various shapes. The processor 130 may control the display 120 to execute and display functions corresponding to the various shapes.

As illustrated, the hand touch of the user may be an O-shaped hand touch 412, and a function corresponding to the O-shaped hand touch 412 may be the menu UI 413 including UI elements capable of selecting a kind of pen.

In detail, the menu UI 413 may be positioned at an end portion of the right of an O-shaped hand of the user.

However, this is only an example, and in the case in which the hand touch 412 is performed by the right hand, the menu UI 413 may also be positioned at an end portion of the left of an O-shaped hand. In addition, the menu UI 413 is not limited to be positioned at the abovementioned position, but may also be positioned at an appropriate place in the vicinity of the hand of the user.

Figure 4B:
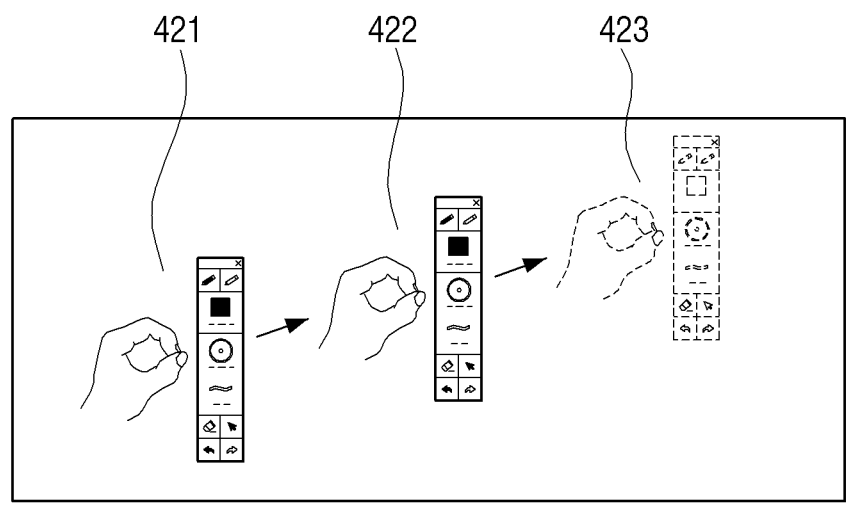

Meanwhile, as illustrated in FIG. 4B, in the case in which the hand touch of the user moves while being maintained, the processor 130 may control the display 120 to move and display a generated menu UI along a moving direction of the hand touch. As illustrated in FIG. 4B, a hand and a menu UI represented by dotted lines are a hand and a menu UI that are moved or removed, respectively.

That is, the first hand touch and a menu UI 421 may move to the second hand touch and a menu UI 422, respectively, while being maintained.

In addition, in the case in which the hand touch of the user is removed (as represented by a reference numeral 423), the menu UI displayed on the display 120 may also be removed. Therefore, the user may display the menu UI on the display 120 through the hand touch only if necessary. That is, a trouble in which the user needs to move or remove the menu UI hindering the writing may be reduced.

Figure 4C:
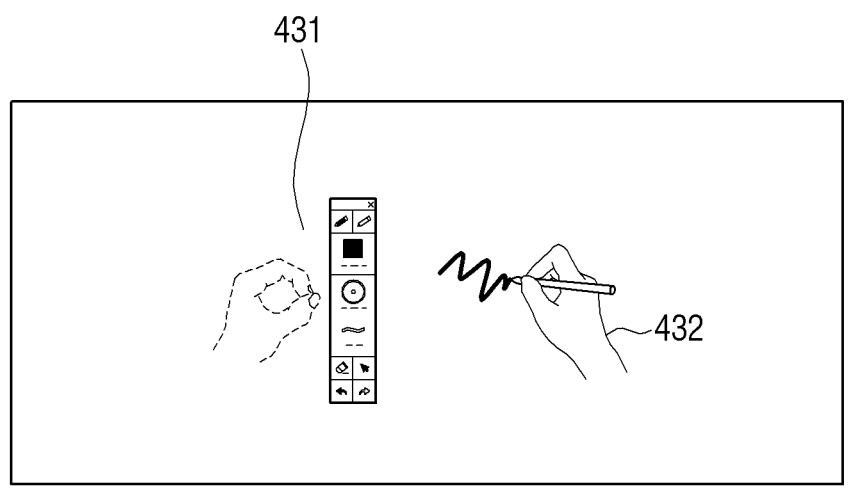

However, in the case in which the hand touch of the user is removed, the menu UI displayed on the display 120 may also be maintained. As illustrated in FIG. 4C, even in the case in which a pen touch 432 and a hand touch of the user exist and the hand touch of the user is removed later (431), the display 120 may display a menu UI.

An example of a method of removing the menu UI, the processor 130 may control the display 120 to remove the menu UI when a predetermined time elapses after the hand touch of the user is removed.

As another example, one of the plurality of UI elements included in the menu UI may be a UI element about a function of removing the menu. Here, in the case in which a menu removing UI element is the touched by the pen, the processor 130 may control the display 120 to remove the menu UI.

As still another example, in the case in which the hand touch of the user is a double-tap hand touch in which a hand touch is continuously performed twice, the processor 130 may control the display 120 to maintain and display the menu UI even though the hand touch is removed.

Figure 4D:
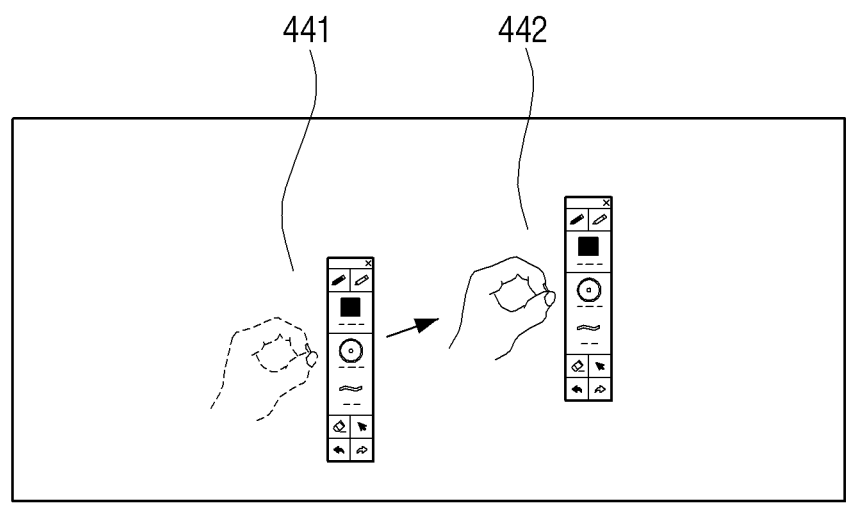

Meanwhile, FIG. 4D is diagram illustrating an example method of moving a menu UI 441 in the case of maintaining the menu UI 441. In detail, the processor 130 may sense a hand touch of the user at any position on the display 120 during a period in which the first menu UI 441 is maintained. In this case, the processor 130 may control the display 120 to remove the first menu UI 441 that is maintained and generate and display a second menu UI 442 at a position corresponding to the hand touch.

Figure 5A:
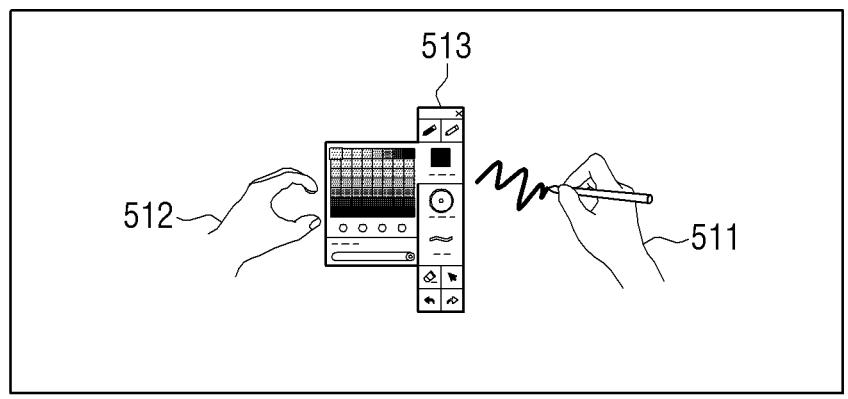
FIGS. 5A, 5B and 5C are diagrams illustrating an example method of executing a menu UI corresponding to a hand touch and selecting any one of a plurality of UI elements included in the menu UI according to an example embodiment of the present disclosure.
Figure 5B:
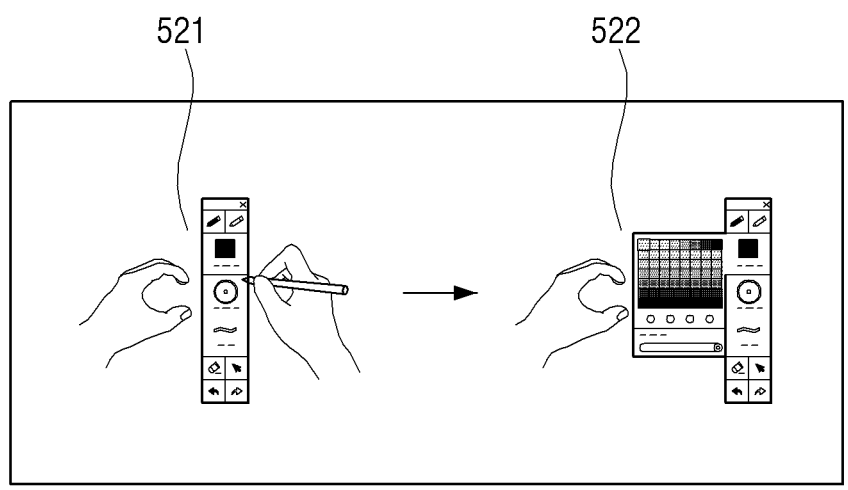
Figure 5C:
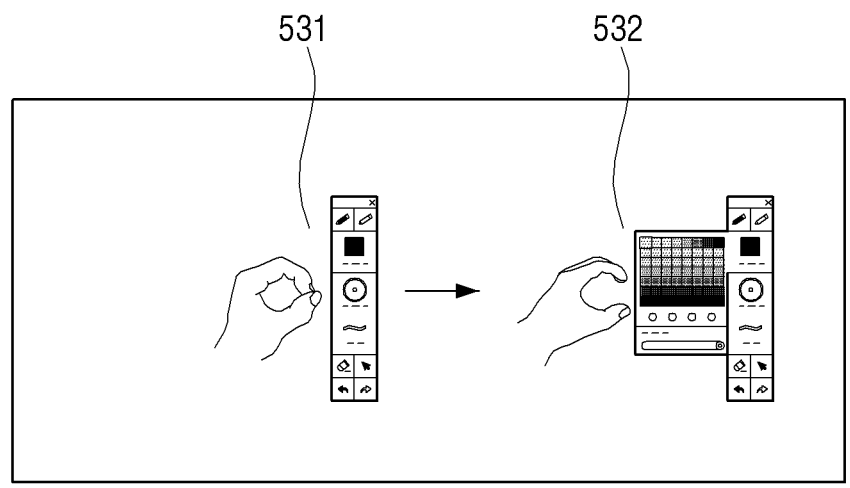

FIGS. 5A, 5B and 5C are diagrams illustrating an example method of executing a menu UI corresponding to a hand touch and selecting any one of a plurality of UI elements included in the menu UI according to an example embodiment of the present disclosure.

As illustrated in FIG. 5A, in the case in which the processor 130 receives a C-shaped hand touch 512 from the sensor 110 during a period in which the user performs a pen touch 511 to execute a writing function, the processor 130 may control the display 120 to display a menu UI 513 including UI elements capable of selecting a thickness and a color of a pen.

FIG. 5B is a diagram illustrating an example method of selecting a plurality of UI elements included in a menu UI displayed on the display 120. In detail, in the case in which a pen touch of the user is sensed in a plurality of UI elements on a menu UI 521, the processor 130 may execute a function corresponding to the touched UI element.

Here, the function of the UI element may be a function for expansion to a sub-menu 522 of the menu UI displayed on the display 120. In detail, as illustrated in FIG. 5B, in the case in which an UI element for selecting a color on the menu UI 521 is touched, the processor 130 may control the display 120 to additionally display a color selection menu UI 522, which is a sub-menu corresponding to the touched UI element.

FIG. 5C is a diagram illustrating an example case in which a shape of a hand is changed during a period in which a hand touch of the user is maintained.

In detail, in the case in which an O-shaped hand touch of the user and a menu UI 531 corresponding to the O-shaped hand touch are generated and the O-shaped hand touch is changed to a C-shaped hand touch 532 while a touch is maintained, the processor 130 may control the display 120 to display a menu UI corresponding to the C-shaped hand touch.

However, this is only an example, and the present disclosure is not limited thereto. For example, in the case in which the hand touch of the user is maintained, even though a shape of the hand is changed from an O shape to a C shape, the processor 130 may control the display 120 to maintain a menu UI corresponding to the O-shaped hand touch. In this case, when the user removes the O-shaped hand touch and then again inputs the C-shaped hand touch, the processor 130 may control the display 120 to remove the menu UI corresponding to the O-shaped hand touch and display the menu UI corresponding to the C-shaped hand touch.

Figure 6:
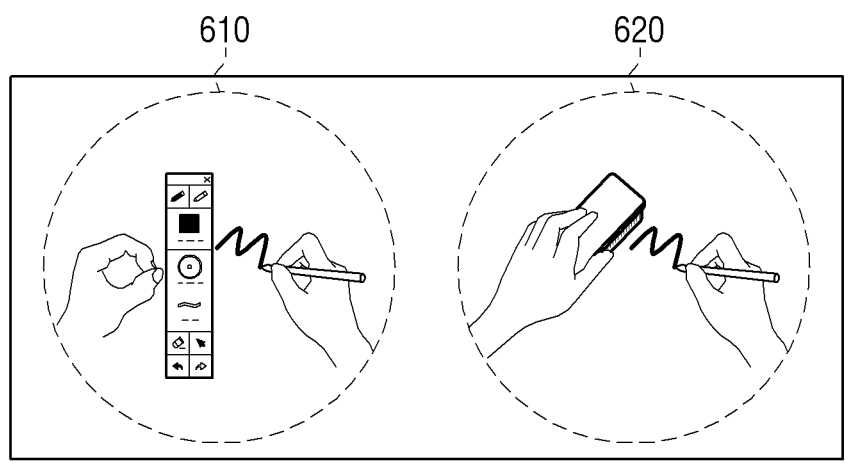
FIG. 6 is diagram illustrating an example case in which a plurality of users use a display apparatus according to an example embodiment of the present disclosure.

FIG. 6 is diagram illustrating an example case in which a plurality of users use a display apparatus 100 according to an example embodiment of the present disclosure.

First touches of each of a first user and a second user may be pen touches. The pen touch of the first user and the pen touch of the second user may be distinguished from each other using frequencies set in the respective pens. In detail, when the first touches of the first user and the second user are sensed through the sensor 110, the processor 130 may execute writing functions corresponding to the respective first touches. The processor 130 may obtain coordinate values at which the respective first touches are input, and may receive second touches input by the respective users in predetermined ranges 610 and 620 based on the obtained coordinate values. In the case in which the sensor 110 senses the respective second touches in the predetermined ranges 610 and 620, the processor 130 may execute functions corresponding to the respective second touches.

Here, the predetermined ranges 610 and 620 may be determined in consideration of radii of action of the first user and the second user on the basis of the coordinate values of the first touches of each of the first user and the second user. However, the predetermined ranges are not limited thereto, but may be determined by deciding positions of the users by a camera or may be determined by various other methods.

Meanwhile, a shape of a hand touch may be various. As described above, the shape of the hand touch may be an O shape or a C shape. However, the shape of the hand touch is not limited thereto, and functions corresponding to various types of hand touches may be executed depending on the various types of hand touches.

As an example, a type of hand touch may be determined using the number of fingers touching the display. Hereinafter, a process of deciding a type of hand using a finger touch according to an example embodiment of the present disclosure and a function corresponding to the type of hand will be described in greater detail below with reference to FIGS. 7 to 12. Hereinafter, the type of hand using the finger touch may be referred to as a finger touch pattern.

Here, both of a first touch and a second touch may be hand touches, but are not limited thereto.

Figure 7:
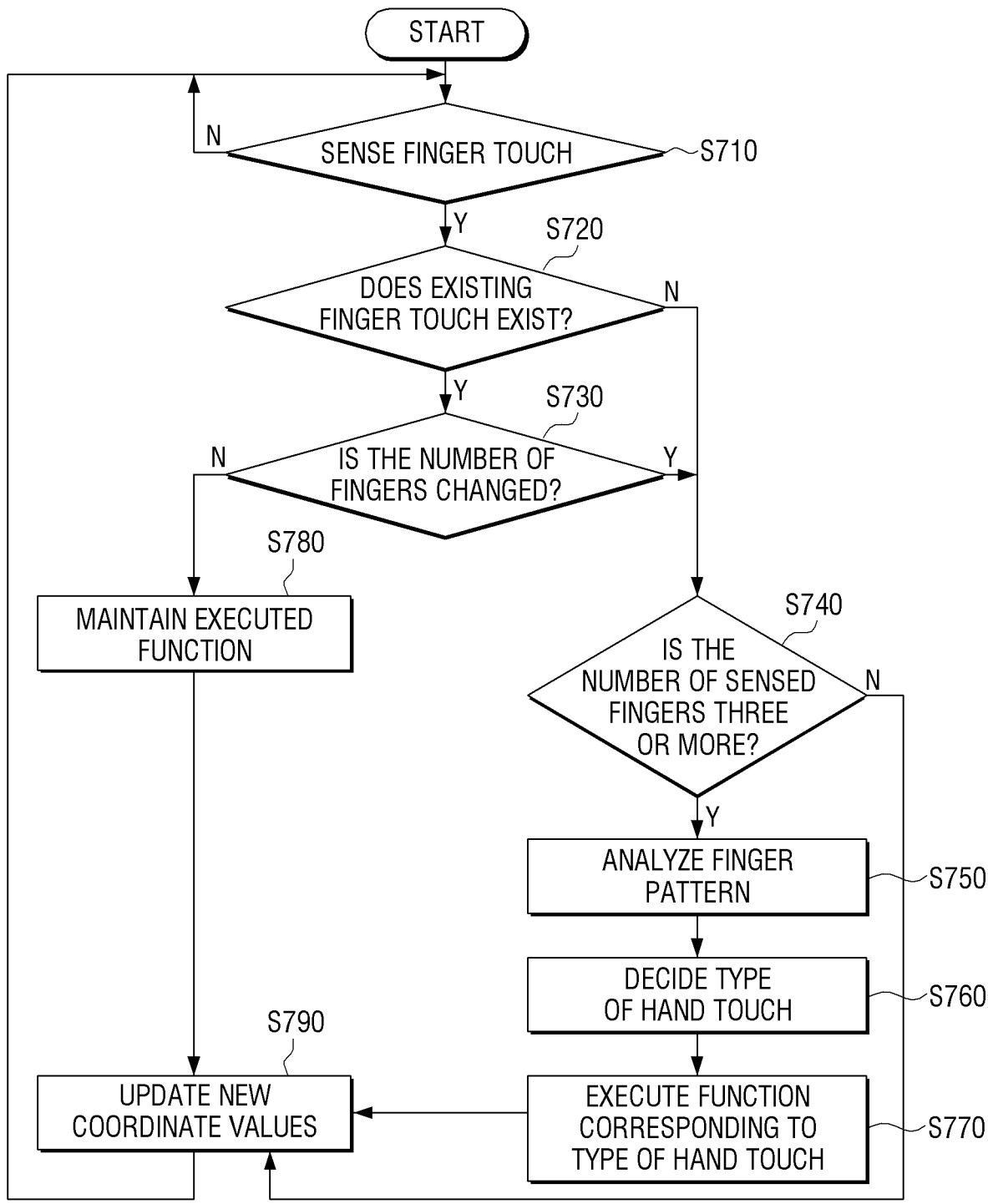
FIG. 7 is a flowchart illustrating an example method of sensing a pattern of a hand touch in a display apparatus according to an example embodiment of the present disclosure.

FIG. 7 is a flowchart illustrating an example method of sensing a pattern of a hand touch in a display apparatus according to an example embodiment of the present disclosure.

Referring to FIG. 7, the display apparatus 100 may sense a finger touch of a user (S710). In the case in which the finger touch of the user is sensed, the display apparatus 100 may decide whether or not an existing finger touch exists (S720). That is, in S720, it may be decided whether the finger touch input to the display apparatus 100 is an initial signal or an additional signal.

In the case in which the finger touch input to the display apparatus 100 is the initial signal, the processor 130 may decide the number of fingers (S740).

Here, in the case in which the number of fingers is two or less, the processor 130 does not analyze a pattern, but may update new coordinate values of the sensed fingers (S790).

In the case in which the number of sensed fingers is three or more, the processor 130 may analyze a finger pattern (S750). The analysis of the finger pattern means that a type of hand touch depending on a finger touch input is decided as in contents to be described in greater detail below with reference to FIGS. 8A to 8F.

The processor 130 may analyze the finger pattern in S750 to decide whether the finger pattern is the left, the right, or the middle (S760). Here, the left means a case in which a type of hand touch is the left hand, the right means a case in which a type of hand touch is the right hand, and the middle means a case in which it may not be decided whether a type of hand touch is the left hand or the right hand.

In the case in which the analysis of the finger pattern by S760 ends, the processor 130 may execute a UI corresponding to the finger pattern or type of hand touch (S770), and may update new coordinates of the sensed fingers (S790).

Again returning to S720, in the case in which the finger touch input to the display apparatus 100 is the additional signal, the processor 130 may compare the number of fingers touching the display with the number of fingers in the previous finger touch to decide whether or not the number of fingers touching the display is changed (S730).

In the case in which a change in the number of fingers does not exist, the processor 130 may decide the number of fingers (S740).

Here, in the case in which the number of fingers is one or two, the processor 130 does not analyze the pattern, but may update the new coordinate values of the sensed fingers (S790).

In the case in which the number of sensed fingers is three or more, the processor 130 may analyze the finger pattern (S750).

The processor 130 may analyze the finger pattern in S750 to decide whether the type of hand touch is the left, the right, or the middle (S760).

In the case in which the analysis of the finger pattern by S760 ends, the processor 130 may execute the UI corresponding to the finger pattern (S770), and may update the new coordinates of the sensed fingers (S790).

Again returning to S730, in the case in which the number of fingers touching the display is not changed, the processor 130 may maintain an existing UI (S780), and may update the new coordinates of the sensed fingers (S790).

FIGS. 8A, 8B, 8C, 8D, 8E and 8F are diagrams illustrating an example method of deciding a type of hand touch according to an example embodiment of the present disclosure.

Figure 8A:
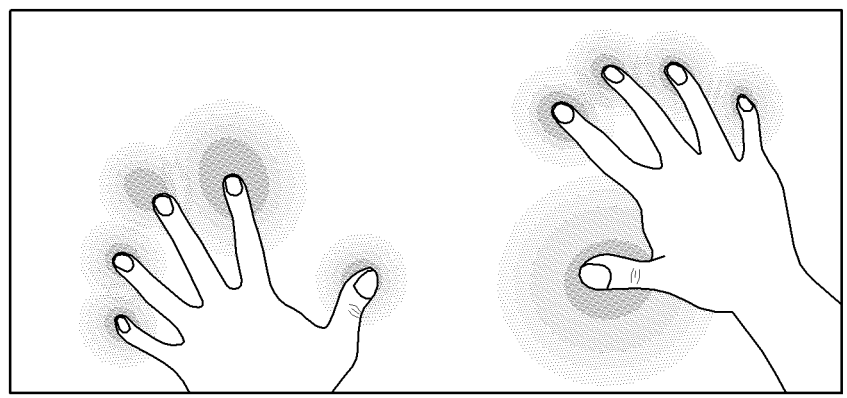
FIGS. 8A, 8B, 8C, 8D, 8E and 8F are diagrams illustrating an example method of deciding a type of hand touch according to an example embodiment of the present disclosure.

As illustrated in FIG. 8A, when a plurality of finger touches are input, the processor 130 may obtain coordinates of fingers touching the display 120 through the sensor 110. The processor 130 may decide the number of fingers touching the display 120 using information on the coordinates obtained in the sensor 110.

Figure 8B:
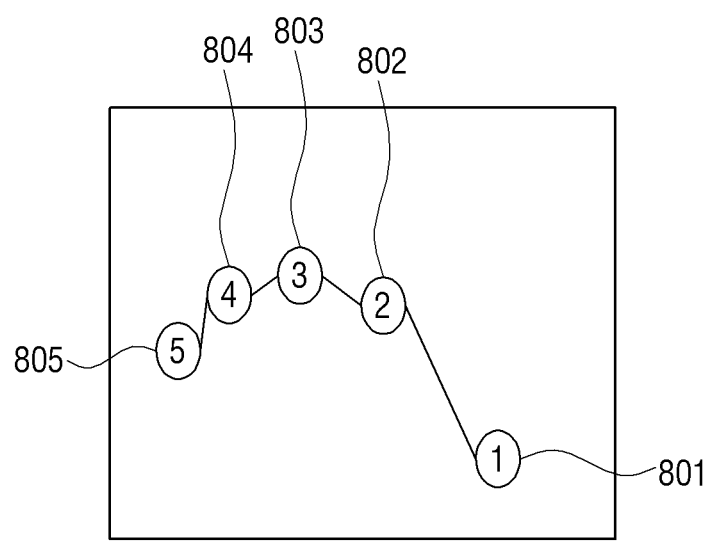
Figure 8C:
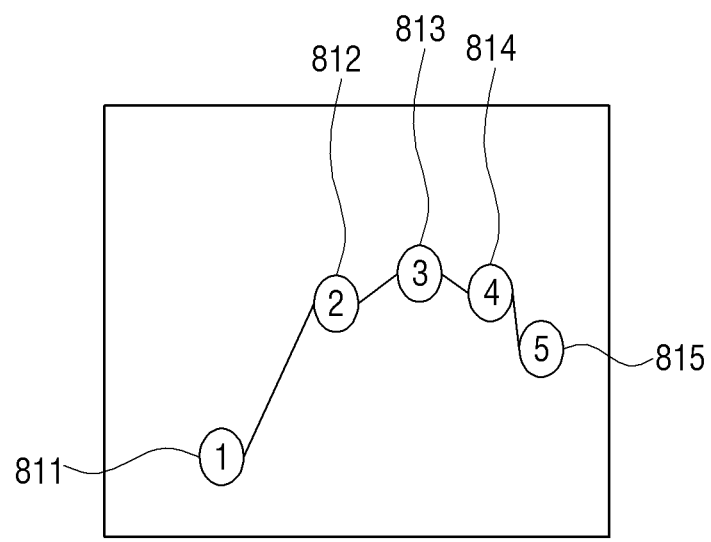

FIGS. 8B and 8C are diagrams illustrating an example method of distinguishing types of hand touches from each other in the case in which the number of fingers touching the display 120, sensed by the sensor 110 is five.

In the case in which the processor 130 receives coordinates of the fingers touching the display from the sensor 110, the processor 130 may decide the number of fingers, and may generate a virtual window as illustrated in FIGS. 8B and 8C.

The processor 130 may analyze the virtual window, and may decide that a hand of a user touching the display is the left hand in the case in which the received coordinates are 801, 802, 803, 804 and 805 and decide that a hand of the user touch the display is the right hand in the case in which the received coordinates are 811, 812, 813, 814 and 815.

The processor 130 may measure distances between coordinate values at which a plurality of fingers touch the display, and may analyze the measured distances to decide whether the hand of the user touching the display is the left hand or the right hand. In detail, the processor 130 may detect a thumb 801 or 811 through the fact that a distance between a thumb and a forefinger is longer than that between other two adjacent fingers in a general touch input, and in the case in which a finger touch is sensed at the left (in the case of 801) or the right (in the case of 811) of the thumb, the processor 130 may decide that the hand of the user touching the display is the left hand or the right hand.

Figure 8D:
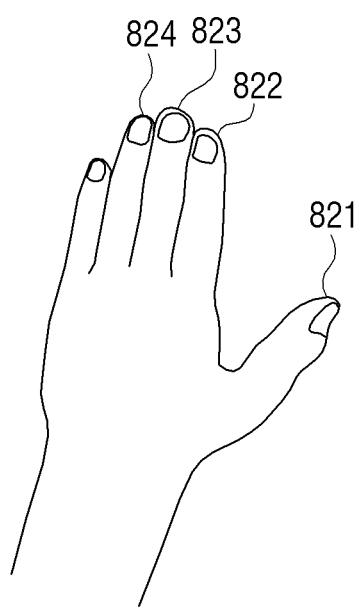
Figure 8E:
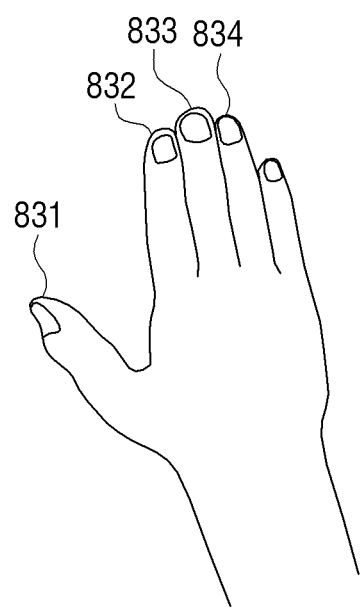

FIGS. 8D and 8E are diagrams illustrating an example method of distinguishing types of hand touches from each other in the case in which the number of fingers touching the display, sensed by the sensor 110 is four according to an example embodiment of the present disclosure.

In detail, FIGS. 8D and 8E illustrate a deciding method in the case in which four fingers touch the display and one of the fingers touching the display is a thumb.

In the case in which the processor 130 receives coordinates of the fingers touching the display from the sensor 110, the processor 130 may decide the number of fingers, and may generate a virtual window as illustrated in FIGS. 8D and 8E.

The processor 130 may analyze the virtual window, and may decide that a hand of a user touching the display is the left hand in the case in which the received coordinates are 821, 822, 823 and 824 and decide that a hand of the user touching the display is the right hand in the case in which the received coordinates are 831, 832, 833 and 834.

Although a case in which the number of fingers touching the display is five or four is described in FIGS. 8B to 8E, the same method may be applied to a case in which the number of fingers touching the display is three. That is, also in the case (not illustrated) in which fingers input to the sensor 110 are 821 to 823 or 831 to 833, the processor 130 may decide whether a hand of a user touching the display is the left hand or the right hand.

Figure 8F:
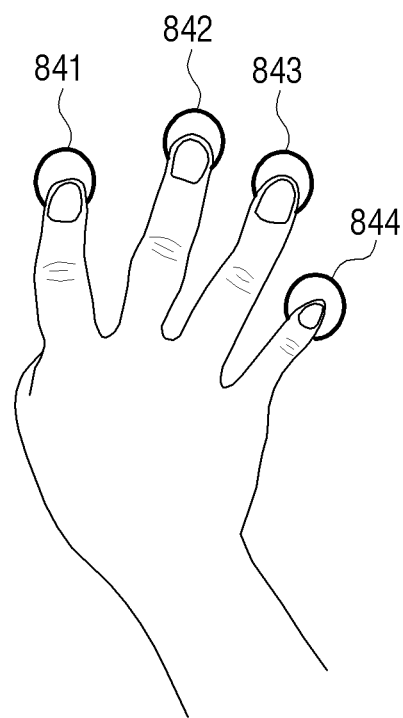

FIG. 8F illustrates a deciding method in the case in which a thumb does not touch the display. As illustrated in FIG. 8F, in the case in which coordinates input to the sensor 110 are 841, 842, 843 and 844, the processor 130 does not decide whether a hand touching the display is the right hand or the left hand. As described above, in this case, a type of hand touch is a "middle". Therefore, when the type of hand touch corresponding to the middle is input, the processor 130 may execute a function corresponding to the type of hand touch and the number of fingers.

Figure 9A:
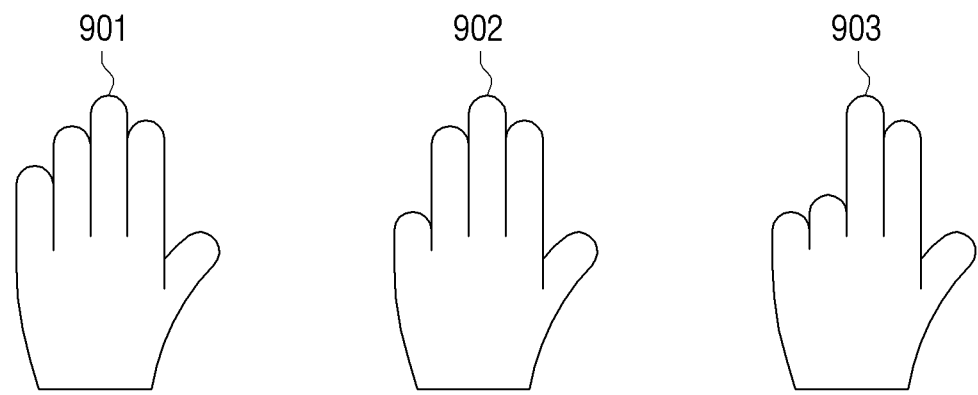
FIGS. 9A, 9B and 9C are diagrams illustrating example functions corresponding to types of hand touches and the numbers of fingers according to an example embodiment of the present disclosure.
Figure 9B:
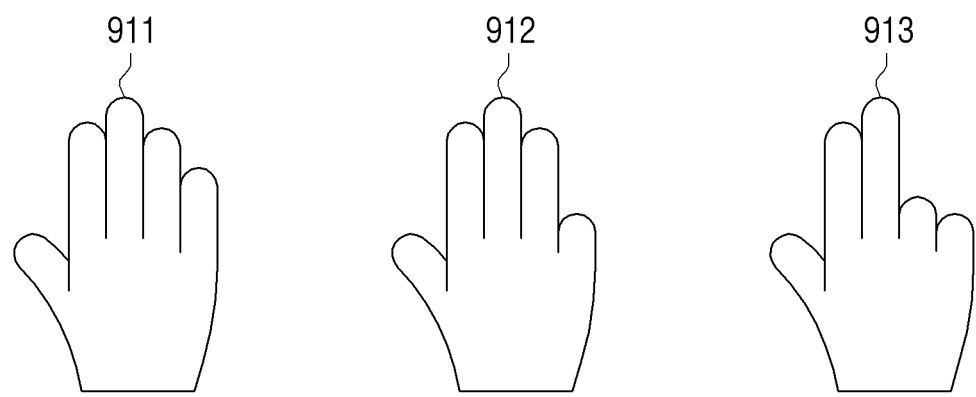
Figure 9C:
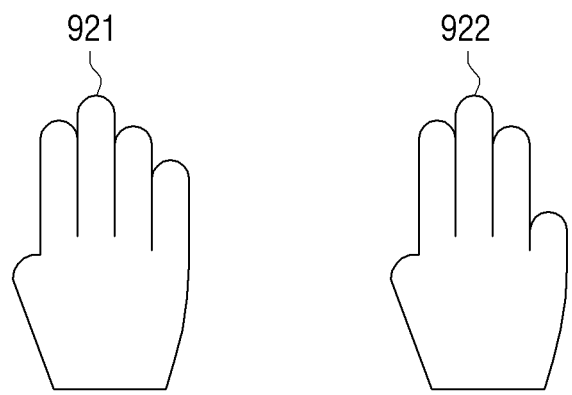

FIGS. 9A, 9B and 9C are diagrams illustrating example functions corresponding to types of hand touches and the numbers of fingers according to an example embodiment of the present disclosure.

FIG. 9A illustrates operations that may be distinguished from each other in the case in which a touch pattern is the left, FIG. 9B illustrates operations that may be distinguished from each other in the case in which a touch pattern is the right, and FIG. 9C illustrates operations that may be distinguished from each other in the case in which a touch pattern is the middle.

Although kinds of fingers touching the display are not considered when the touch patterns are analyzed in FIGS. 9A to 9C, the touch patterns may also be classified in consideration of the kinds of fingers touching the display.

For example, a touch pattern in the case in which a thumb, a forefinger, and a middle finger touch the display and a touch pattern in the case in which a thumb, a forefinger, and a ring finger touch the display may be configured to perform different functions. In detail, although a case in which a thumb, a forefinger, a middle finger, and a ring finger touch the display is illustrated in 902 of FIG. 9A, kinds of fingers except for the thumb may be changed. That is, a touch operation including any three of the forefinger, the middle finger, and the ring finger, and a little finger may also be considered. The number of cases that may be considered in FIGS. 9A and 9B is represented by the following Table 1, and the number of cases that may be considered in FIG. 9C is represented by the following Table 2. In the following Tables, O indicates a case in which a corresponding finger touches the display, and X indicates a case in which a corresponding finger does not touch the display.

TABLE 1

| Left/Right | Thumb | Forefinger | Middle Finger | Ring Finger | Little Finger |
|---|---|---|---|---|---|
| 1 | O | O | O | O | O |
| 2 | O | O | O | O | X |
| 3 | O | O | O | X | O |
| 4 | O | O | X | O | O |
| 5 | O | X | O | O | O |
| 6 | O | O | O | X | X |
| 7 | O | O | X | O | X |
| 8 | O | O | X | X | O |
| 9 | O | X | O | O | X |
| 10 | O | X | O | X | O |
| 11 | O | X | X | O | O |

TABLE 2

| Middle | Forefinger | Middle Finger | Ring Finger | Little Finger |
|---|---|---|---|---|
| 1 | O | O | O | O |
| 2 | O | O | O | X |
| 3 | O | O | X | O |
| 4 | O | X | O | O |
| 5 | X | O | O | O |

That is, Configuration 1 of Table 1 represents 901 of FIG. 9A and 911 of FIG. 9B, Configuration 2 of Table 1 represents 902 of FIG. 9A and 912 of FIG. 9B, Configuration 6 of Table 1 represents 903 of FIG. 9A and 913 of FIG. 9B, Configuration 1 of Table 2 represents 921 of FIG. 9C, and Configuration 2 of Table 2 represents 922 of FIG. 9C. However, touch patterns that are not illustrated in the drawings like Configurations 3 to 5 and 7 to 11 of Table 1 and Configurations 3 to 5 of Table 2 may be considered.

Here, the respective functions corresponding to the respective touch patterns of the above Tables 1 and 2 may be executed.

In FIGS. 9A to 9C, touch patterns in the case in which the number of fingers of a user is three or more are considered. However, this is an example in the case in which a touch input through the sensor 110 is an initial signal, and the number of fingers may be one or two in the case in which an input touch is an additional signal as in contents to be described below.

In addition, in the case in which the input touch is the additional signal, various functions may be executed using a change in the number of fingers together with types of hand touches.

For example, operations may be executed by combining the types of hand touches and the change in the number of fingers described above with each other. In detail, in the case in which a hand of a user is changed from 901 to 902 or is changed from 901 to 903 in FIG. 9A, different functions may be performed. This is a content of S730 of FIG. 7 described above. Likewise, also in 911 to 913 of FIG. 9B and 921 and 922 of FIG. 9C, corresponding functions may be executed while variously changing the number of fingers.

Although only a case in which the number of fingers touching the display is three or more is illustrated in FIGS. 9A to 9C, when the input touch is the additional signal, in the case in which the number of fingers is reduced to one or two, different functions may also be performed. An example in the case in which the number of fingers is reduced to one or two will be described in greater detail below with reference to FIGS. 10D and 10E.

FIGS. 10A, 10B, 10C, 10D and 10E are diagrams illustrating example generation of an eraser UI and performance of a function according to an example embodiment of the present disclosure.

Figure 10A:
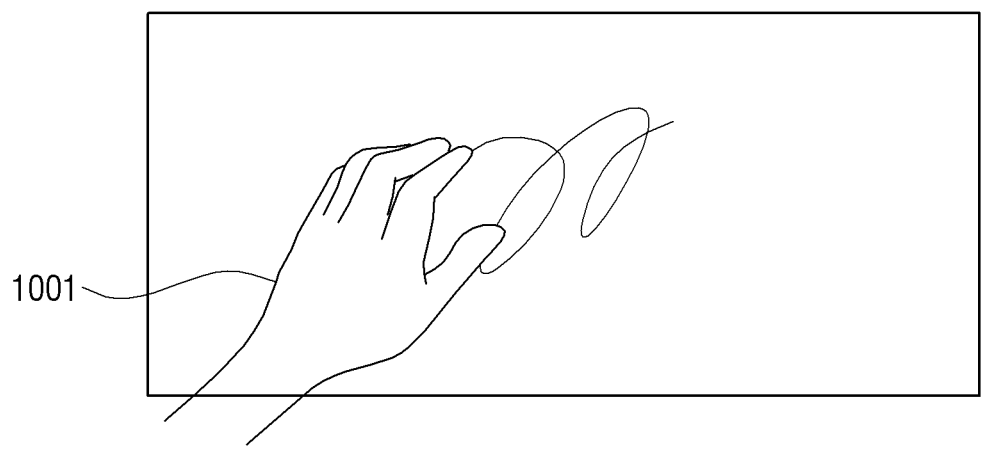
FIGS. 10A, 10B, 10C, 10D and 10E are diagrams illustrating example generation of an eraser UI and performance of a function according to an example embodiment of the present disclosure.
Figure 10B:
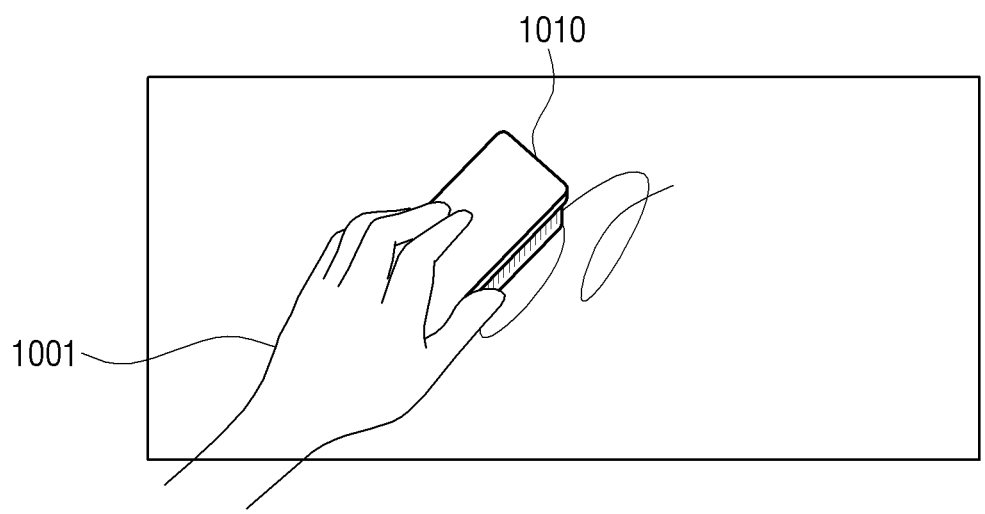

As illustrated in FIGS. 10A and 10B, in the case 1001 in which five fingers of the left hand of a user touch the display apparatus 100, an eraser UI 1010 may be generated. In this case, the processor 130 may analyze coordinates of the fingers touching the display apparatus to decide that a type of hand touch is the left hand, and may generate the eraser UI 1010, which is a function corresponding to the type of hand touch.

Here, in the case in which the fingers stop, an erasing function of the eraser UI 1010 is not executed, and in the case in which the fingers move, an eraser operation of the eraser UI 1010 may be executed. However, the present disclosure is not limited thereto. That is, a function of the eraser UI 1010 may also be executed as soon as the eraser UI 1010 is generated.

Figure 10C:
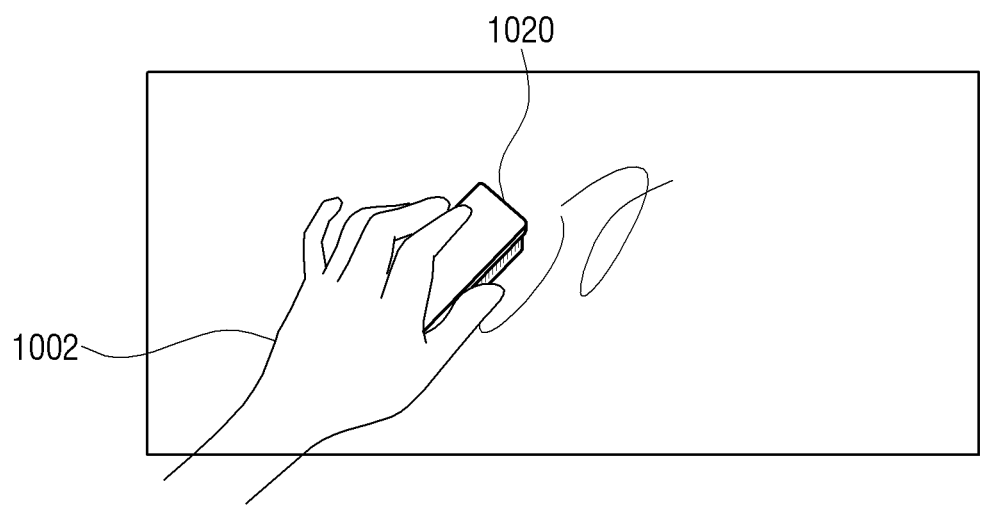

FIG. 10C is a diagram illustrating an example for an eraser UI function in the case in which an operation of executing the eraser operation in FIG. 10B stops and the number of fingers touching the display apparatus is reduced. In detail, in the case 1002 in which a little finger is removed from the display 120 after the fingers stop, a size of an eraser UI 1020 may be reduced, and an area that may be erased may also be reduced.

In addition, although an example of a case in which the number of fingers touching the display apparatus is reduced by 1 is described in FIGS. 10B and 10C, a corresponding function may be executed also in the case (not illustrated) in which the number of fingers is reduced by two.

In detail, in the case in which a little finger and a ring finger are removed from the display 120 after the fingers stop, a size of an eraser UI may be reduced, and an area that may be erased may also be reduced. Here, sizes of the eraser UI and the area that may be erased in the case in which the number of fingers touching the display apparatus is reduced by two may be smaller than those of the eraser UI and the area that may be erased in the case in which the number of fingers touching the display apparatus is reduced by one.

Although a case in which the number of fingers touching the display apparatus is reduced from five to four (in detail, a case in which a touch of the little finger is removed) is described in FIGS. 10B and 10C, the number of fingers touching the display apparatus may be reduced from five to three, as described above, or may be reduced from four to three.

In addition, although a case in which a touch of the little finger or the ring finger is removed is described by way of example in FIGS. 10B and 10C, touches of the fingers except for the thumb may be removed, as described in the abovementioned Tables 1 and 2.

Figure 10D:
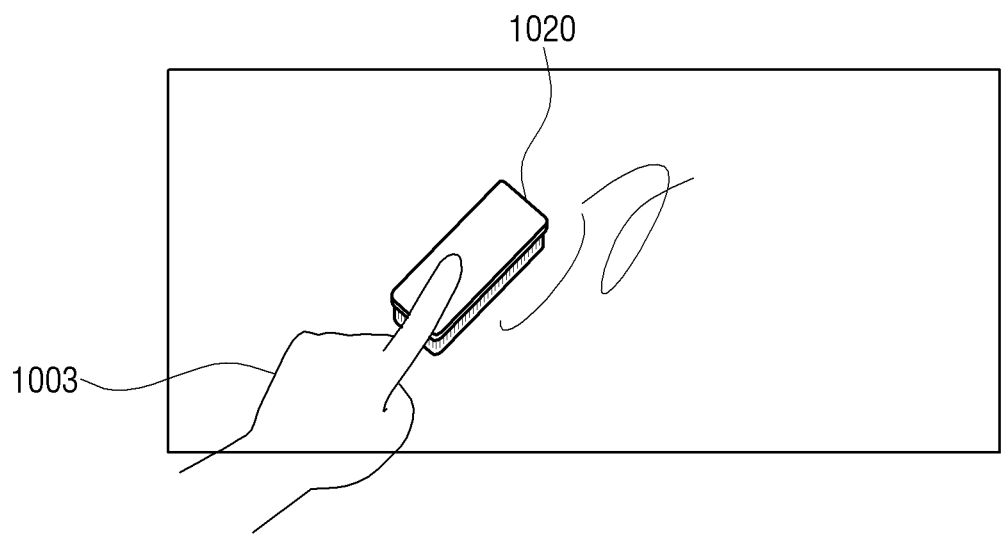

FIG. 10D is a diagram illustrating changes in the eraser UI and the function in the case in which the number of fingers touching the display apparatus is reduced from three or more to one or two.

In detail, in the case 1003 in which a finger touching the display apparatus is a forefinger as illustrated in FIG. 10D in a finger touch as illustrated in FIG. 10C, a size and a function of the eraser UI 1020 may be maintained in the same state as that of FIG. 10C.

Although the case 1003 in which the finger touching the display apparatus is the forefinger is described in FIG. 10D, the same function as that of FIG. 10D may be performed in the case in which the finger touching the display apparatus is another finger including a thumb as well as in the case 1003 in which the finger touching the display apparatus is the forefinger. In addition, although a case in which the number of fingers touching the display apparatus is one is described in FIG. 10D, the same function as that of FIG. 10D may be performed also in the case in which the number of fingers touching the display apparatus is two. Also in this case, the same function may be performed as long as kinds of two fingers touching the display apparatus are a thumb and any one finger.

Figure 10E:
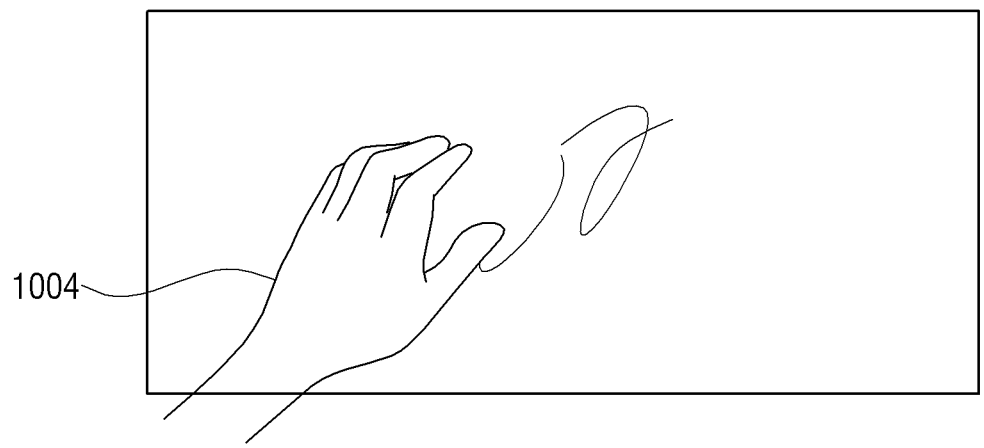

In the case 1004 in which all of the fingers touching the display apparatus are removed in a state in which the eraser UI is generated, the eraser UI may disappear as illustrated in FIG. 10E.

FIGS. 11A, 11B, 11C and 11D are diagrams illustrating an example menu UI according to an example embodiment of the present disclosure.

Figure 11A:
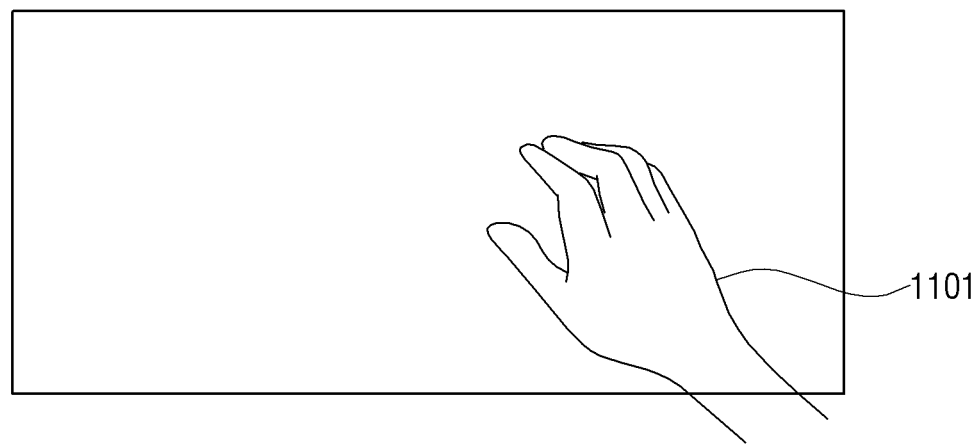
FIGS. 11A, 11B, 11C and 11D are diagrams illustrating an example menu UI according to an example embodiment of the present disclosure.
Figure 11B:
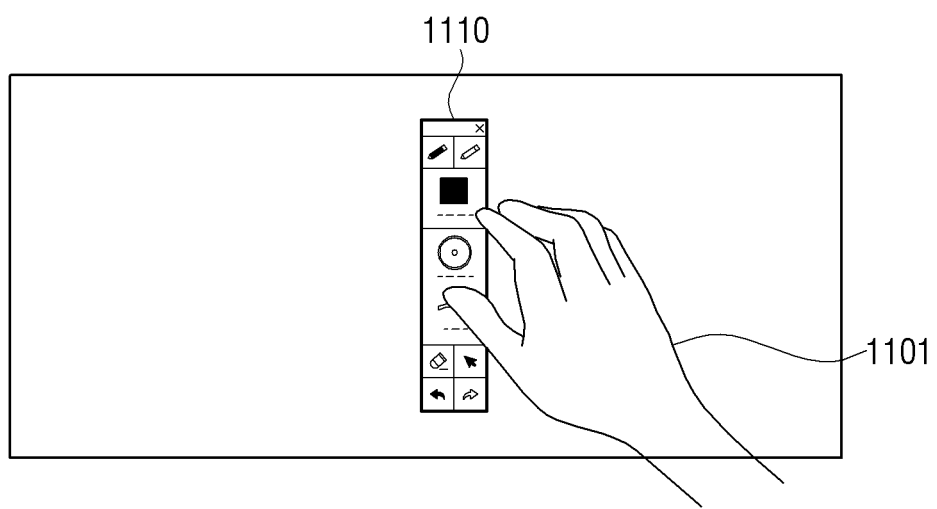

As illustrated in FIGS. 11A and 11B, in the case 1101 in which five fingers of the right hand of a user touch the display apparatus 100, a menu UI 1110 may be generated. In this case, the processor 130 may analyze coordinates of the fingers touching the display apparatus to decide that a type of hand touch is the right hand, and may generate the menu UI, which is a function corresponding to the type of hand touch.

Figure 11C:
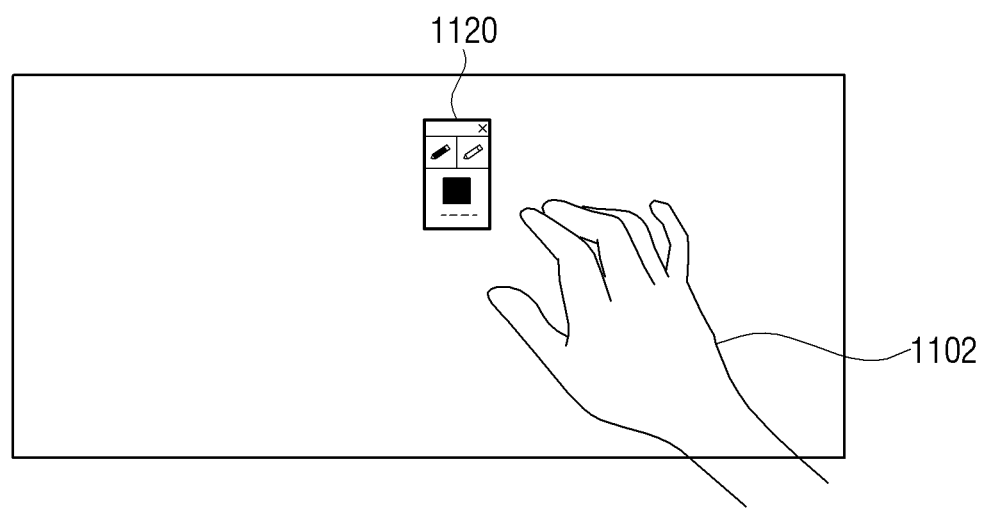

FIG. 11C is a diagram illustrating an example description for a menu UI function in the case of reducing the number of fingers touching the display apparatus in FIG. 11B. In detail, in the case 1102 in which a little finger is removed from the display 120, the number of menus on the menu UI 1120 may be reduced.

In addition, although an example of the case 1102 in which the number of fingers touching the display apparatus is reduced by 1 is described in FIGS. 11B and 11C, a corresponding function may be executed also in the case (not illustrated) in which the number of fingers is reduced by two.

In detail, in the case in which a little finger and a ring finger are removed from the display 120, a size of the menu UI may be reduced, and the number of menus on the menu UI may be reduced. The number of menus on the menu UI in the case in which the number of fingers touching the display apparatus is reduced by two may be smaller than that in the case in which the number of fingers touching the display apparatus is reduced by one.

Although a case in which the number of fingers touching the display apparatus is reduced from five to four (in detail, a case in which a touch of the little finger is removed) is described in FIGS. 11B and 11C, the number of fingers touching the display apparatus may be reduced from five to three, as described above, or may be reduced from four to three.

In addition, although a case in which a touch of the little finger or the ring finger is removed is described by way of example in FIGS. 11B and 11C, touches of the fingers except for the thumb may be removed, as described in the abovementioned Tables 1 and 2.

Figure 11D:
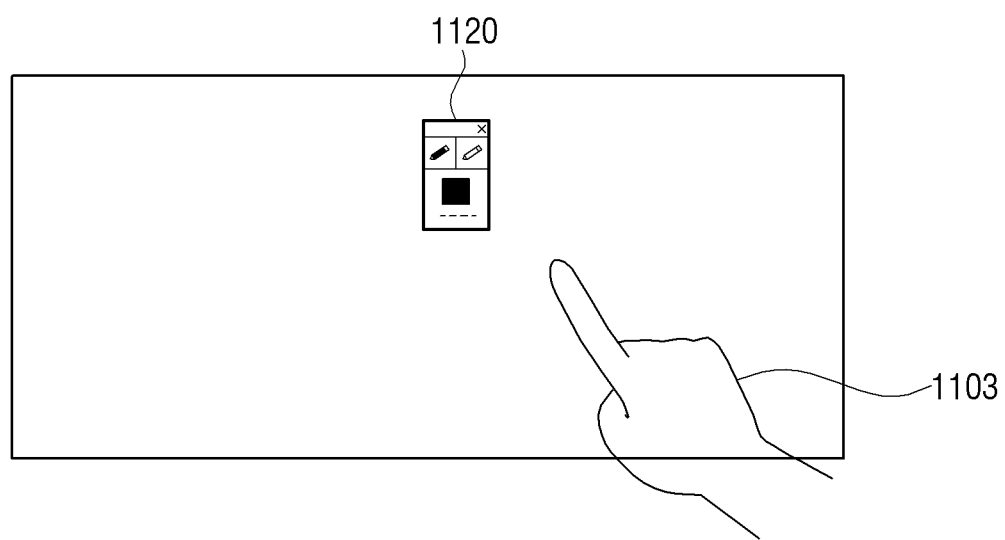

FIG. 11D is a diagram illustrating changes in a change in the menu UI in the case in which the number of fingers touching the display apparatus is reduced from three or more to one or two.

In detail, in the case 1103 in which a finger touching the display apparatus is a forefinger as illustrated in FIG. 11D in a finger touch as illustrated in FIG. 11C, the menu UI 1120 may be maintained in the same state as that of FIG. 11C.

Although the case 1103 in which the finger touching the display apparatus is the forefinger is described in FIG. 11D, the same function as that of FIG. 11D may be performed in the case in which the finger touching the display apparatus is another finger including a thumb as well as in the case in which the finger touching the display apparatus is the forefinger. In addition, although a case in which the number of fingers touching the display apparatus is one is described in FIG. 11D, the same function as that of FIG. 11D may be performed also in the case in which the number of fingers touching the display apparatus is two. Also in this case, the same function may be performed as long as kinds of two fingers touching the display apparatus are a thumb and any one finger.

In the case in which all of the fingers touching the display apparatus are removed in a state in which the menu UI is generated, the menu UI may disappear.

Meanwhile, although a case in which the eraser UI is generated by the touch of the left hand and the menu UI is generated by the touch of the right hand is illustrated in FIGS. 10A to 11D, the eraser UI may also be generated by the touch of the right hand and the menu UI may also be generated by the touch of the left hand.

In addition, the present disclosure is not limited to the abovementioned example embodiments, and various functions may be performed on each of the touch inputs depending on combinations between the abovementioned touch patterns (the left, the right, and the middle) and the numbers of fingers.

Further, various functions may also be performed on each of the touch inputs depending on combinations among the touch patterns, the numbers of fingers, and kinds of fingers, and in an operation in which the number of fingers is changed, different functions may be performed depending on a sequence of fingers of which touches are removed.

Figure 12:
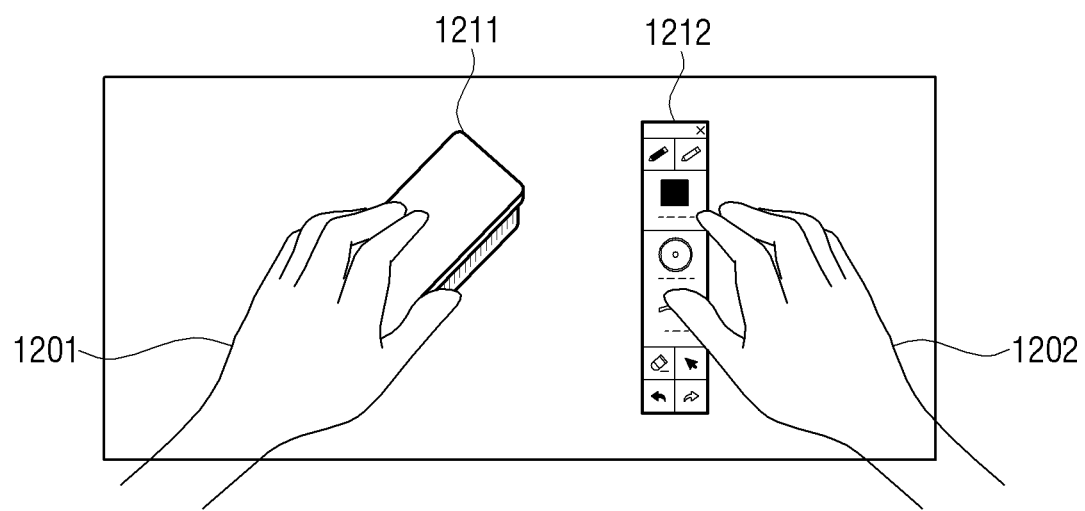
FIG. 12 is a diagram illustrating an example case of simultaneously using both hands according to an example embodiment of the present disclosure.

FIG. 12 is diagram illustrating an example case of simultaneously using both hands according to an example embodiment of the present disclosure.

As illustrated in FIG. 12, a user may independently execute an eraser UI 1211 and a menu UI 1212 using both hands. That is, the user may touch the display apparatus with the left hand 1201 to generate the eraser UI 1211, and at the same time, touch the display apparatus with the right hand 1202 to generate the menu UI 1212.

Meanwhile, although a case in which the type of hand touch is decided using the fingers touching the display apparatuses and the function corresponding to the hand touch is executed is described in FIGS. 7 to 12, it may be extended to various example embodiments.

As an example, in the case in which the hand touch is input after the pen touch is input as described above, the processor 130 may obtain a coordinate value of the pen touch, and may control the sensor 110 to receive the hand touch in a predetermined range from the coordinate value.

As another example, in the case in which the pen touch is input after the hand touch is input, the processor 130 may decide a type of hand touch, obtain a coordinate value of the hand touch, and may control the sensor 110 to receive the pen touch in a predetermined range from the coordinate value. In detail, in the case in which the display apparatus 100 receives a right hand touch of the user, the predetermined range may be set to the left of the right hand touch, and in the case in which the display apparatus 100 receives a left hand touch of the user, the predetermined range may be set to the right of the left hand touch.

In addition, as described above, both of the first touch and the second touch may also be the hand touches.

Figure 13:
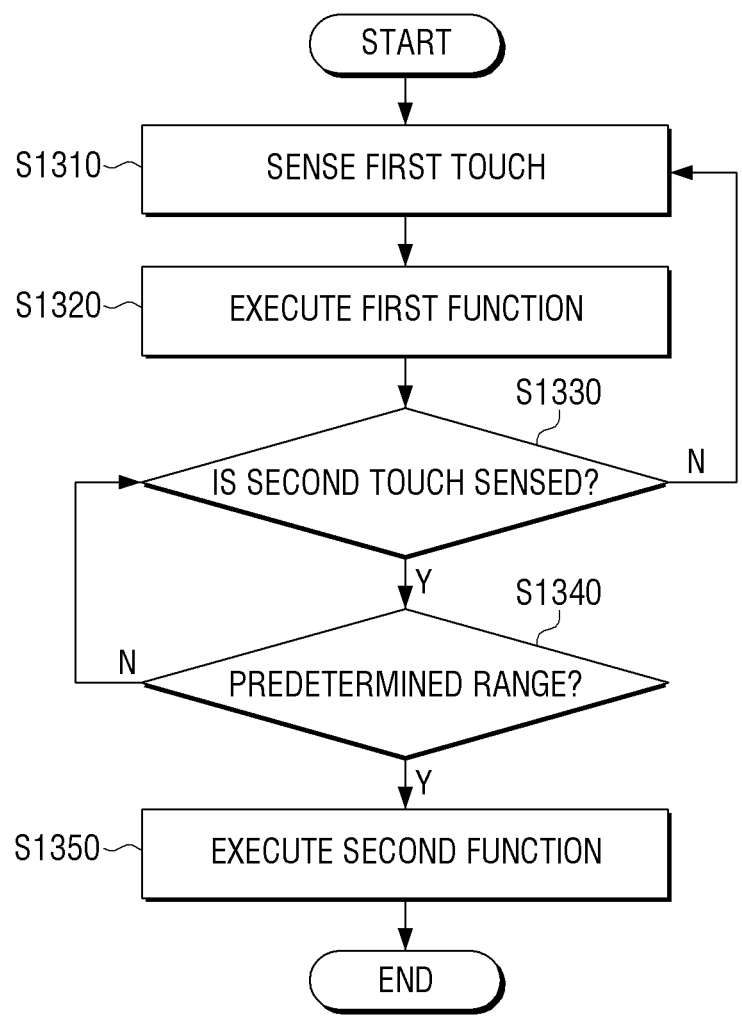
FIG. 13 is a flowchart illustrating an example operation of a display apparatus receiving a plurality of touches according to an example embodiment of the present disclosure.

FIG. 13 is a flowchart illustrating an example operation of a display apparatus receiving a plurality of touches according to an example embodiment of the present disclosure.

As illustrated in FIG. 13, the first sensor 111 may sense a first touch of the user (S1310). Here, the first touch of the user may be the pen touch, but is not limited thereto. That is, the first touch may be the hand touch or a touch by another touch tool.

In the case in which the first sensor 111 senses the first touch, the processor 130 may execute a first function corresponding to the first touch of the user, and may control the display 120 to display a screen related to the first function (S1320). Here, the first function may be a writing function, but is not limited thereto. Therefore, the first function may be a function for selecting UI elements, and may include functions that may be easily inferred by those skilled in the art.

Here, in the case in which a second touch is not sensed (S1330-N), the processor 130 may wait for sensing of the first touch. On the other hand, in the case in which the second touch is sensed (S1330-Y), the processor 130 may decide whether or not the sensed second touch is a touch in a predetermined range (S1340).

In the case in which the second touch is the touch in the predetermined range (S1340-Y), the processor 130 may execute a second function corresponding to the second touch, and may control the display 120 to display a screen related to the second function (S1350).

In this case, the second touch of the user may be touches having various shapes. For example, in the case in which the first touch of the user has a first shape, the processor 130 may control the display 120 to display a menu UI. For example, in the case in which the second touch of the user has a second shape, the processor 130 may control the display 120 to display an eraser UI. However, this is only an example of the present disclosure, and the processor 130 may execute various functions corresponding to touches having various shapes.

Meanwhile, in the case in which the second touch of the user is not the touch in the predetermined range (S1340-N), the processor 130 may not execute the second function. However, this is only an example, and the processor 130 may execute another function in the case in which the second touch is sensed at a position that is not in the predetermined range. For example, in the case in which the second touch is sensed at the position that is not in the predetermined range, the processor 130 may control the display 120 to display state information of the display apparatus 100. However, this is only an example, and the processor 130 may control the display 120 to execute general other functions corresponding to hand touches.

Although various example embodiments of the present disclosure have been described hereinabove, it may be understood by those skilled in the art that the example embodiments described above may be combined with each other and the present disclosure may be variously modified and altered without departing from the scope and spirit of the present disclosure described in the following claims.

What is claimed is:

1. A method of controlling a display apparatus, the method comprising:
    sensing a first touch on a display screen;
    executing a function corresponding to the first touch;
    sensing a second touch in a predetermined range of the first touch based on a coordinate value at which the first touch is sensed during a period in which the first touch is input; and
    executing a function corresponding to the second touch at a coordinate value at which the second touch is sensed in response to the second touch,
    wherein the executing the function corresponding to the first touch comprises executing a writing function based on the first touch,
    wherein the executing the function corresponding to the second touch comprises displaying a user interface (UI) for controlling the writing function, and
    wherein the UI comprises, based on a shape represented by the second touch being a first shape, a UI element related to a first function in the writing function, and based on a shape represented by the second touch being a second shape, a UI element related to a second function in the writing function,
    wherein the writing function comprises a function of displaying a text using a pen based on a coordinate value at which the first touch is sensed, and
    wherein the first function is a function for selecting a type of the pen, and the second function is a function for selecting a thickness of the pen.

2. The method as claimed in claim 1, wherein the executing a function corresponding to the second touch includes executing a menu user interface (UI) including a plurality of UI elements in a predetermined vicinity of the coordinate value at which the second touch is sensed based on identifying that the second touch is a touch having a first shape.

3. The method as claimed in claim 2, wherein the executing a function corresponding to the second touch includes moving the menu UI to correspond to a moving direction of the second touch based on identifying that the second touch moves during a period in which the menu UI is displayed.

4. The method as claimed in claim 2, wherein the executing a function corresponding to the second touch further includes removing the menu UI on the display screen based on identifying that the second touch is removed during a period in which the menu UI is displayed.

5. The method as claimed in claim 2, wherein the executing a function corresponding to the second touch further includes executing a function corresponding to a touched UI element based on identifying that one of the plurality of UI elements is touched during a period in which the menu UI is displayed.

6. The method as claimed in claim 1, wherein in the executing a function corresponding to the second touch, an eraser function of erasing a writing function is executed in the predetermined range of the coordinate value at which the second touch is sensed, based on identifying that the second touch is a touch having a second shape.

7. The method as claimed in claim 1, wherein the first touch is a pen touch, and the second touch is a finger touch.

8. The method as claimed in claim 7, further comprising sensing pen touches and hand touches of each of a plurality of users,
wherein the pen touches of the plurality of users are distinguished from each other using frequencies set in pens of each of the plurality of users.

9. The method as claimed in claim 8, further comprising displaying an indicator indicating users corresponding to a plurality of menus where the plurality of menus are displayed by each of second touches of the plurality of users.

10. A display apparatus comprising:
a display;
a sensor; and
a processor configured to control the sensor to sense a touch on the display, to execute a writing function corresponding to a first touch when the first touch is sensed through the sensor, and to execute a function corresponding to a second touch at a coordinate value at which the second touch is sensed in response to the second touch when the second touch is sensed in a predetermined range of the first touch based on a coordinate value at which the first touch is sensed during a period in which the first touch is input,
wherein the processor is further configured to, when the first touch is sensed through the sensor, execute a writing function based on the first touch, and when the second touch is sensed in a predetermined range of the first touch, display a user interface (UI) for controlling the writing function, and
wherein the UI comprises, based on a shape represented by the second touch being a first shape, a UI element related to a first function in the writing function, and based on a shape represented by the second touch being a second shape, a UI element related to a second function in the writing function,
wherein the writing function comprises a function of displaying a text using a pen based on a coordinate value at which the first touch is sensed, and
wherein the first function is a function for selecting a type of the pen, and the second function is a function for selecting a thickness of the pen.

11. The display apparatus as claimed in claim 10, wherein the processor is configured to control the display to display a menu UI including a plurality of UI elements in a predetermined vicinity of the coordinate value at which the second touch is sensed based on identifying that the second touch is a touch having a first shape.

12. The display apparatus as claimed in claim 11, wherein the processor is configured to control the display to move the menu UI to correspond to a moving direction of the second touch based on identifying that the second touch moves during a period in which the menu UI is displayed.

13. The display apparatus as claimed in claim 11, wherein the processor is configured to control the display to remove the menu UI based on identifying that the second touch is removed during a period in which the menu UI is displayed.

14. The display apparatus as claimed in claim 11, wherein the menu UI includes at least one of: at least one UI element for setting the writing function and at least one UI element for setting the display apparatus.

15. The display apparatus as claimed in claim 10, wherein the processor is configured to execute an eraser function of erasing the writing function in the predetermined vicinity of the coordinate value at which the second touch is sensed based on identifying that the second touch is a touch having a second shape.

16. The display apparatus as claimed in claim 10, wherein the first touch is a pen touch and the second touch is a finger touch, and
the sensor includes:
a first sensor configured to sense the pen touch; and
a second sensor configured to sense the finger touch.

17. The display apparatus as claimed in claim 16, wherein the processor is configured to distinguish pen touches of a plurality of users from each other using frequencies set in pens of each of the plurality of users.

18. The display apparatus as claimed in claim 17, wherein the processor is configured to control the display to display an indicator indicating users corresponding to a plurality of menus where the plurality of menus are displayed by each of second touches of the plurality of users.

* * * * *